United States Patent [19]
Newkirk et al.

[11] Patent Number: 5,458,480
[45] Date of Patent: Oct. 17, 1995

[54] TOOLING MATERIALS FOR MOLDS

[76] Inventors: Marc S. Newkirk, 1251 Corner Ketch Rd., Newark, Del. 19711; Robert L. Simpson, 25 Gilbank Drive, Aurora, Ontario, L4G 5G5, Canada; Paul W. Niskanen, 31 Silverwood Blvd., Newark, Del. 19711; Eric M. Klier, 5923 Charnwood Rd., Catonsville, Md. 21228

[21] Appl. No.: 70,439
[22] PCT Filed: Dec. 5, 1991
[86] PCT No.: PCT/US91/09118
   § 371 Date: Oct. 6, 1993
   § 102(e) Date: Oct. 6, 1993

Related U.S. Application Data

[63] Continuation-in-part of Ser. No. 622,998, Dec. 5, 1990, abandoned.

[51] Int. Cl.$^6$ .................. B29C 33/00; B29C 33/02
[52] U.S. Cl. .................. 425/547; 425/542; 164/97
[58] Field of Search ............. 164/97, 98, 100–105, 164/362, 542, 547

[56] References Cited

U.S. PATENT DOCUMENTS

| | | | |
|---|---|---|---|
| 3,608,055 | 9/1971 | Long | 264/316 |
| 3,658,121 | 4/1972 | Douglas | 164/312 |
| 3,779,304 | 12/1973 | Miki | 164/312 |
| 3,914,101 | 10/1975 | Stefanka | 425/387 R |
| 3,915,699 | 12/1975 | Umehara et al. | 75/208 R |
| 4,087,224 | 5/1978 | Moser | 425/388 |
| 4,314,399 | 2/1982 | Severinsson | 29/420 |
| 4,713,360 | 12/1987 | Newkirk et al. | 501/87 |
| 4,798,237 | 1/1989 | Nakano | 164/312 |
| 4,818,734 | 4/1989 | Kantner et al. | 501/128 |
| 4,828,008 | 5/1989 | White et al. | 164/66.1 |
| 4,828,785 | 5/1989 | Newkirk | 264/60 |
| 4,851,375 | 7/1989 | Newkirk et al. | 501/88 |
| 4,853,352 | 8/1989 | Newkirk et al. | 501/88 |
| 4,859,640 | 8/1989 | Newkirk | 501/128 |
| 4,871,008 | 10/1989 | Dwivedi | 164/6 |
| 4,871,008 | 12/1989 | Dwivedi et al. | 164/6 |
| 4,885,130 | 12/1989 | Claar et al. | 419/12 |
| 4,900,699 | 2/1990 | Newkirk et al. | 501/94 |
| 4,915,736 | 4/1990 | Claar et al. | 75/238 |
| 4,916,113 | 4/1990 | Newkirk | 264/65 |
| 4,918,034 | 4/1990 | Weinstein et al. | 501/87 |
| 4,923,832 | 5/1990 | Newkirk et al. | 501/87 |
| 4,935,055 | 6/1990 | Aghajanian | 164/107 |
| 4,940,679 | 7/1990 | Claar et al. | 501/96 |

(List continued on next page.)

FOREIGN PATENT DOCUMENTS

| | | |
|---|---|---|
| 0245193 | 11/1987 | European Pat. Off. . |
| 0291441 | 11/1988 | European Pat. Off. . |
| 0324706 | 7/1989 | European Pat. Off. . |
| 0339894 | 11/1989 | European Pat. Off. . |
| 0375588 | 6/1990 | European Pat. Off. . |
| 0409763 | 1/1991 | European Pat. Off. . |
| 2339465 | 8/1977 | France . |
| 1616759 | 12/1990 | U.S.S.R. ............... 164/362 |
| 8102126 | 8/1981 | WIPO . |
| 9200256 | 1/1992 | WIPO . |

OTHER PUBLICATIONS

Appendix A—Other Documents International Search Report for International Patent Application Serial No. PCT/US91/09118 (see attached Search report).

Primary Examiner—Kuang Y. Lin
Attorney, Agent, or Firm—Kevin J. Boland

[57] ABSTRACT

This invention relates generally to the fabrication of materials for use as tools in various applications. Specific emphasis is placed upon certain ceramic matrix composite materials and metal matrix composite materials for use as tools as well as certain ceramic matrix composite and/or metal matrix composite coatings on substrate materials, also for use as tools. This invention makes specific reference to a number of different materials for use as tools in the molding of thermoplastic materials (e.g., polymers, plastics, ceramics, glasses, metals) with particular emphasis being directed to the thermoplastic molding of plastics or polymers.

12 Claims, 8 Drawing Sheets

U.S. PATENT DOCUMENTS

| | | | |
|---|---|---|---|
| 4,977,947 | 12/1990 | Boswell | 164/97 |
| 4,998,578 | 3/1991 | Dwivedi | 164/6 |
| 5,004,034 | 4/1991 | Park | 164/98 |
| 5,013,228 | 5/1991 | Thornthwaite et al. | 425/2 |
| 5,017,526 | 5/1991 | Newkirk et al. | 501/89 |
| 5,051,382 | 9/1991 | Newkirk | 428/702 |
| 5,076,339 | 12/1991 | Smith | 164/72 |
| 5,198,232 | 3/1993 | Thornthwaite et al. | 425/2 |
| 5,282,734 | 2/1994 | Pastureau et al. | 425/393 |

5,458,480

TOOLING MATERIALS FOR MOLDS

This a continuation-in-part of 07/622,998, filed Dec. 5, 1990, now abandoned.

TECHNICAL INVENTION

This invention relates generally to the fabrication of materials for use as tools in various applications. Specific emphasis is placed upon certain ceramic matrix composite materials and metal matrix composite materials for use as tools as well as certain ceramic matrix composite and/or metal matrix composite coatings on substrate materials, also for use as tools. This invention makes specific reference to a number of different materials for use as tools in the molding of thermoplastic materials (e.g., polymers, plastics, ceramics, glasses, metals) with particular emphasis being directed to the thermoplastic molding of plastics or polymers.

BACKGROUND ART

The prior art is replete with numerous attempts to make various tools from different materials. Tools for use in the fabrication of metals, ceramics, glasses, plastics, polymers, etc., are used primarily to shape the aforementioned materials in a predetermined manner. Thus, simply stated, a tool can be utilized to manufacture shaped ceramic, metal, glass and/or polymer or plastic products.

Many different types of tools currently exist for plastically deforming polymer or plastic materials. For example, tools for making shapes by blow molding, tools for making shapes by vacuum molding, compression molding tools, injection molding tools, tools against which materials are contacted or layed-up, tools for vacuum lay-ups, etc., are all examples of tools which are useful for making shaped plastics or polymers.

While the prior art contains many exemplary tools, numerous problems exist in tool design, as well as in the specific materials which are utilized for tools. For example, in the plastic or polymer molding industry, the materials utilized for tools suffer from various drawbacks, including short usable life times (e.g., the tools suffer from high wear either in localized areas or throughout the entire tool, thermal shock problems, etc. ), poor thermal conductivity, the relative inability to match the coefficient of thermal expansion of the tool to the formed product, unacceptably long lead time requirements for the preparation and manufacture of tools, high machining costs associated with the formation of tools (e.g., especially when the tools have an intricate or complex shape), the inability to control accurately and in a cost efficient manner the localized heating and/or cooling characteristics of the tool, large and sometimes quite heavy and awkwardly shaped tools, substantial difficulties in replicating master mold finishes, poor surface finishes, etc. The above-discussed problems are just a few of the problems facing manufacturers today, any one of which can result in high production costs and/or longer production times.

French Patent No. 7702248 relates to a method of producing a mold for use as part of a tool for shaping of mold or mold materials and having relatively high strength and heat resistance characteristics. According to the invention, there is formed a porous body of sinterable material in contact with a pattern to form a material-shaping surface of the body; the body when still in contact with the pattern surface is sintered and the sintered body is at least partially filled with infiltrating material having a melting point lower than that of the sintered body. The infiltrating step is effected in such manner that the pores of the surface of the sintered body in contact with the patterned surface are filled by infiltrating the material from the side of the body opposite to the pattern surface through to the surface which is formed by the patterned surface. The sintered porous body comprises a metal body. The infiltrating material also preferably comprises a metal, although non-metallic materials are also conceivable.

WO-A-81/02126 is directed to a method of producing an article and an article produced in a mold which defines the contour of the article. Specifically, an article as produced in a mold which defines the contours of the article, said article mainly consisting on the one hand of sinterable material which can be given a relatively easily shaped geometry, has the characteristics of forming a relatively porous body during sintering, such as a metal powder, which material is sintered in the mold, and on the other hand of a matrix consisting of a metal with a lower melting point than the sintering temperature for the sinterable material, said matrix metal infiltrating the porous body so that it fills in the pores of the sintered material, at least in the mold surface, and is molded by the mold before it is caused to solidify. The article also contains one or more cooling passages consisting of a metal tube with a melting point which is higher than the sintering temperature, the outside of the tube being metallically connected to the infiltrated matrix metal. In the method of producing the article, the mold is filled with powder or grains of the sinterable material, so that the tube is embedded in the sinterable material.

The present invention overcomes the difficulties referenced above as well as certain limitations of the prior art, and more, by providing novel materials for use as tools as well as new and improved tooling designs. Thus, the present invention results in tools having desirable mechanical properties which permit the repeated and reliable manufacture of complex shaped parts in large quantities, such parts potentially having quality characteristics heretofore being unachievable in a cost effective manner.

Description of Commonly Owned U.S. Patents and Patent Applications

The subject matter of this application is related to that of several Commonly Owned Patents and Commonly Owned and Copending Patent Applications. Particularly, these Patents and Patent Applications describe novel methods for making ceramic matrix composite materials (hereinafter sometimes referred to as "Commonly Owned Ceramic Matrix Patent Applications") and metal matrix composite materials (hereinafter sometimes referred to as "Commonly Owned Metal Matrix Patent(s) and Patent Application(s)").

A novel approach to the formation of ceramic materials is disclosed generically in Commonly Owned U.S. Pat. No. 4,713,360, which issued on Dec. 15, 1987, in the names of Marc S. Newkirk et al., and entitled "Novel Ceramic Materials and Methods for Making Same". This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in Commonly Owned U.S. Pat. No. 4,853,352, which issued on Aug. 1, 1989, in the names of Marc S. Newkirk et al., and entitled "Methods of Making Self-Supporting Ceramic Materials" (a European counterpart to U.S. application Ser. No. 06/747,788, now abandoned, was published in the EPO on Jan. 22, 1986, as Publication No. 0,169,067).

A novel method for producing a self-supporting ceramic composite by growing an oxidation reaction product from a parent metal into a permeable mass of filler is disclosed in commonly owned and copending U.S. patent application Ser. No. 07/433,733, filed Nov. 30, 1989, and entitled "Method of Making Composite Articles Having Embedded Filler", which is a continuation-in-part of commonly owned and copending U.S. patent application Ser. No. 07/415,180, filed Sep. 29, 1989, which is a divisional U.S. Pat. No. 4,916,113, issued Apr. 10, 1990, and entitled "Methods of Making Composite Articles Having Embedded Filler", which is a continuation of U.S. Pat. No. 4,851,375, issued Jul. 25, 1989, and entitled "Composite Ceramic Articles and Methods of Making the Same", all of which are in the names of Marc S. Newkirk, et al.

A method for producing ceramic composite bodies having a predetermined geometry or shape is disclosed in Commonly Owned and Copending U.S. patent application Ser. No. 07/338,471, filed Apr. 14, 1989, (and now allowed) which is a continuation of U.S. application Ser. No. 06/861,025, filed May 8, 1986 (and now abandoned), both in the names of Marc S. Newkirk et al. (a European counterpart to which was published in the EPO on Nov. 11, 1987, as Publication No. 0,245,192). In accordance with the method in this U.S. Patent Application, the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 07/295,488, filed Jan. 10, 1989, which is a continuation of U.S. Pat. No. 4,923,832, which issued May 8, 1990, both in the names of Marc S. Newkirk et al. (a European counterpart to U.S. Pat. No. 4,923,832 was published in the EPO on Nov. 11, 1987, as Publication No. 0,245,193). This method produces shaped self-supporting ceramic bodies, including shaped ceramic composites, by growing the oxidation reaction product of a parent metal to a barrier means spaced apart from the metal for establishing a boundary or surface.

Ceramic composites having a cavity with an interior geometry inversely replicating the shape of a positive mold or pattern are disclosed in (i) Commonly Owned U.S. patent application Ser. No. 07/329,794, filed Mar. 28, 1989, (and now allowed) which is a divisional of U.S. Pat. No. 4,828,785, which issued May 9, 1989, both in the names of Marc S. Newkirk, et al., a European counterpart to which was published in the EPO on Sep. 2, 1987, as Publication No. 0,234,704, and (ii) in U.S. Pat. No. 4,859,640, which issued on Aug. 22, 1989, a European counterpart to which was published in the EPO on Mar. 9, 1988, as Publication No. 0,259,239.

The feeding of additional molten parent metal from a reservoir has been successfully utilized to produce thick ceramic matrix composite structures. Particularly, as disclosed in Commonly Owned U.S. Pat. No. 4,918,034, issued Apr. 17, 1990, which is a continuation-in-part of U.S. Pat. No. 4,900,699, issued Feb. 13, 1990, both in the names of Marc S. Newkirk et al., and entitled "Reservoir Feed Method of Making Ceramic Composite Structures and Structures Made Thereby" (a European counterpart to U.S. Pat. No. 4,900,699 was published in the EPO on Mar. 30, 1988, as Publication No. 0,262,075), the reservoir feed method has been successfully applied to form ceramic matrix composite structures. According to the method of this Newkirk et al. invention, the ceramic or ceramic composite body which is produced comprises a self-supporting ceramic composite structure which includes a ceramic matrix obtained by the oxidation reaction of a parent metal with an oxidant to form a polycrystalline material. In conducting the process, a body of the parent metal and a permeable filler are oriented relative to each other so that formation of the oxidation reaction product will occur in a direction toward and into the filler. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal as the oxidation reaction product continues to be produced and infiltrates the filler. Thus, the reservoir assures that ample parent metal will be available to continue the process until the oxidation reaction product has grown to a desired extent.

A method for tailoring the constituency of the metallic component of a ceramic matrix composite structure is disclosed in Copending and Commonly Owned U.S. patent application Ser. No. 07/389,506, filed on Aug. 2, 1989, which in turn is a continuation of U.S. patent application Ser. No. 06/908,454, filed Sep. 17, 1986 (and now abandoned), both of which are in the names of Marc S. Newkirk et al., and entitled "Method for In Situ Tailoring the Metallic Component of Ceramic Articles and Articles Made Thereby" (a European counterpart to U.S. patent application Ser. No. 06/908,454 was published in the EPO on Apr. 6, 1988, as Publication No. 0,263,051).

Moreover, U.S. patent application Ser. No. 07/269,152, filed Nov. 9, 1988, which is a continuation of U.S. patent application Ser. No. 07/152,518, (which issued as U.S. Pat. No. 4,818,734, on Apr. 4, 1989), in the names of Robert C. Kantner et al., which was a Continuation-in-Part Application of the above-mentioned Ser. No. 06/908,454, having the same title and also being Commonly Owned. This Patent and the above-mentioned application Ser. No. 06/908,454, disclose methods for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by post-forming techniques.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum) is heated to an elevated temperature above its melting point but below the melting point of its oxidation reaction product to form a body of molten parent metal which reacts upon contact with an oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product upon contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum, and the created growth alloy is utilized as the parent metal. The resulting oxidation reaction product of such a growth alloy, in the case of using oxygen as an oxidant, comprises alumina, typically alpha-alumina.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/ or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

Thus, the aforesaid Commonly Owned Ceramic Matrix Patent Applications and Patents describe the production of oxidation reaction products which are readily grown to desired sizes and thicknesses heretofore believed to be difficult, if not impossible, to achieve with conventional ceramic processing techniques.

The production of boride-containing materials has been addressed in commonly owned U.S. Pat. No. 4,885,130 (hereinafter "Patent '130"), which issued Dec. 5, 1989, in the names of T. Dennis Claar, Steven M. Mason, Kevin P. Pochopien, Danny R. White, and William B. Johnson, and is entitled "Process for Preparing Self-Supporting Bodies and Products Made Thereby" (a European counterpart to U.S. Pat. No. 4,885,130 was published in the EPO on Jul. 18, 1990, as Publication No. 0,378,499).

Briefly summarizing the disclosure of Patent '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Patent '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide and/or the boron donor material and/or the carbon donor material are reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal, boride, carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Patent '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Patent '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass of boron carbide, the ratio or parent metal-boride/parent metal-carbide can be adjusted. For example, if zirconium is used as the parent metal, the ratio of $ZrB_2/ZrC$ can be reduced if a carbon donor material is utilized (i.e., more ZrC is produced out to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also effect the morphology of the resultant material.

In another related patent, specifically, U.S. Pat. No. 4,915,736 (hereinafter referred to as "Patent '736"), issued in the names of Terry Dennis Claar and Gerhard Hans Schiroky, on Apr. 10, 1990, and entitled "A Method of Modifying Ceramic Composite Bodies By a Carburization Process and Articles Made Thereby" (a European counterpart to U.S. Pat. No. 4,915,736 was published in the EPO on Jun. 28, 1989, as Publication No. 0,322,346), additional modification techniques are disclosed. Specifically, Patent '736 discloses that a ceramic composite body made in accordance with the teachings of, for example, Patent '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Patent '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5–30 volume percent, such composite body could be modified by a post-carburization treatment to result in from about 0 to about 2 volume percent, typically about ½ to about 2 volume percent, of parent metal remaining in the composite body.

Still further, Copending U.S. patent application Ser. No. 07/296,239, filed on Jan. 12, 1989, is a continuation-in-part application of Patent '736 and discloses that in addition to a carburizing species, a nitriding and/or boriding species may also be utilized to result in similar modifications to the formed composite bodies.

In another somewhat relevant patent application, namely, U.S. patent application Ser. No. 07/543,316, filed on Jun. 25, 1990, in the names of Terry Dennis Claar et al., entitled "Methods for Making Self-Supporting Composite Bodies and Articles Produced Thereby", methods for causing a vapor-phase parent metal to react with a solid oxidant to form a solid reaction product are disclosed. Specifically, in preferred embodiments of the invention, a material, at least a portion of which comprises a solid oxidant, is placed into a reaction chamber. The reaction chamber should be made of, or at least coated with, a material which does not adversely react with any of the materials utilized in the process of the invention. A vapor-phase parent metal source is housed within the reaction chamber in a manner which permits an interaction between the parent metal vapor and the solid oxidant-containing material. Thus, the parent metal vapor should be capable of contacting that portion of the solid oxidant-containing material which is to react with the parent metal vapor. Accordingly, only a portion of a solid oxidant-containing material may need to be exposed to the parent metal vapor or substantially all of a solid oxidant-containing material can be exposed to a parent metal vapor to create reaction product at selected locations. Accordingly, a substrate material, at least a portion of which contains a solid oxidant material, could be coated with reaction product. Such coating may possess desirable mechanical properties enhancing the utilization of the substrate material for particular applications.

A further patent application, U.S. Ser. No. 07/543,277, filed on Jun. 25, 1990, in the name of Terry Dennis Claar and entitled "Method for Forming a Surface Coating", discloses that a solid oxidant source and a parent metal source (e.g., a solid source and/or vapor source) are caused to react on the surface of a substrate material to form a ceramic or ceramic composite coating. Specifically, in a first preferred embodiment of the invention, a substrate material, which may or may not be reactive with a powdered parent metal, is coated with a mixture of powdered parent metal and a solid oxidant powder. The powdered parent metal and solid oxidant powder are caused to react with each other by elevating the temperature in the reaction chamber to the reaction temperature. In a second preferred embodiment of the invention, a substantially inert filler material is mixed with a mixture of a powdered parent metal and a solid oxidant powder prior to causing the powdered parent metal and solid oxidant powder to react together to form a reaction product. Accordingly, products produced according to this invention can be coatings on substrate materials, said coatings resulting in enhanced performance of the substrate material in various environments.

A novel method of making a metal matrix composite material is disclosed in Commonly Owned U.S. Pat. No. 4,828,008, issued May 9, 1989, in the names of White et al., and entitled "Metal Matrix Composites". According to the method of the White et al. invention, a metal matrix composite is produced by infiltrating a permeable mass of filler material (e.g., a ceramic or a ceramic-coated material) with molten aluminum containing at least about 1 percent by weight magnesium, and preferably at least about 3 percent by weight magnesium. Infiltration occurs spontaneously without the application of external pressure or vacuum. A supply of the molten metal alloy is contacted with the mass of filler material at a temperature of at least about 675° C. in the presence of a gas comprising from about 10 to 100 percent, and preferably at least about 50 percent, nitrogen by volume, and a remainder of the gas, if any, being a nonoxidizing gas, e.g., argon. Under these conditions, the molten aluminum alloy infiltrates the ceramic mass under normal atmospheric pressures to form an aluminum (or aluminum alloy) matrix composite. When the desired amount of filler material has been infiltrated with the molten aluminum alloy, the temperature is lowered to solidify the alloy, thereby forming a solid metal matrix structure that embeds the reinforcing filler material. Usually, and preferably, the supply of molten alloy delivered will be sufficient to permit the infiltration to proceed essentially to the boundaries of the mass of filler material. The amount of filler material in the aluminum matrix composites produced according to the White et al. invention may be exceedingly high. In this respect, filler to alloy volumetric ratios of greater than 1:1 may be achieved.

Under the process conditions in the aforesaid White et al. invention, aluminum nitride can form as a discontinuous phase dispersed throughout the aluminum matrix. The amount of nitride in the aluminum matrix may vary depending on such factors as temperature, alloy composition, gas composition and filler material. Thus, by controlling one or more such factors in the system, possible to tailor certain properties of the composite. For some end use applications, however, it may be desirable that the composite contain little or substantially no aluminum nitride.

It has been observed that higher temperatures favor infiltration but render the process more conducive to nitride formation. The White et al. invention allows the choice of a balance between infiltration kinetics and nitride formation.

An example of suitable barrier means for use with metal matrix composite formation is described in Commonly Owned U.S. Pat. No. 4,935,055, issued Jun. 19, 1990, in the names of Michael K. Aghajanian et al., and entitled "Method of Making Metal Matrix Composite with the Use of a Barrier" (a European counterpart to U.S. Pat. No. 4,935,055 was published in the EPO on Jul. 12, 1989, as Publication No. 0,323,945). According to the method of this Aghajanian et al. invention, a barrier means (e.g., particulate titanium diboride or a graphite material such as a flexible graphite tape product sold by Union Carbide under the trade name GRAFOIL®) is disposed on a defined surface boundary of a filler material and matrix alloy infiltrates up to the boundary defined by the barrier means. The barrier means is used to inhibit, prevent, or terminate infiltration of the molten alloy, thereby providing net, or near net, shapes in the resultant metal matrix composite. Accordingly, the formed metal matrix composite bodies have an outer shape which substantially corresponds to the inner shape of the barrier means.

The method of U.S. Pat. No. 4,828,008, was improved upon by Commonly Owned and Copending U.S. patent application Ser. No. 07/517,541, filed Apr. 24, 1990, which is a Continuation of U.S. patent application Ser. No. 07/168,284, filed Mar. 15, 1988 (and now abandoned), both in the names of Michael K. Aghajanian and Marc S. Newkirk and entitled "Metal Matrix Composites and Techniques for Making the Same" (a counterpart to U.S. Pat. No. 4,828,008 was published in the EPO on Nov. 17, 1988, as Publication No. 0,291,441). In accordance with the methods disclosed in this U.S. Patent Application, a matrix metal alloy is present as a first source of metal and as a reservoir of matrix metal alloy which communicates with the first source of molten metal due to, for example, gravity flow. Particularly, under the conditions described in this patent application, the first source of molten matrix alloy begins to infiltrate the mass of filler material under normal atmospheric pressures and thus begins the formation of a metal matrix composite. The first source of molten matrix metal alloy is consumed during its infiltration into the mass of filler material and, if desired, can be replenished, preferably by a continuous means, from the reservoir of molten matrix metal as the spontaneous infiltration continues. When a desired amount of permeable filler has been spontaneously infiltrated by the molten matrix alloy, the temperature is lowered to solidify the alloy, thereby forming a solid metal matrix structure that embeds the reinforcing filler material. It should be understood that the use of a reservoir of metal is simply one embodiment of the invention described in this patent application and it is not necessary to combine the reservoir embodiment with each of the alternate embodiments of the invention disclosed therein, some of which could also be beneficial to use in combination with the present invention.

The reservoir of metal can be present in an amount such that it provides for a sufficient amount of metal to infiltrate the permeable mass of filler material to a predetermined extent. Alternatively, an optional barrier means can contact the permeable mass of filler on at least one side thereof to define a surface boundary.

Moreover, while the supply of molten matrix alloy delivered should be at least sufficient to permit spontaneous infiltration to proceed essentially to the boundaries (e.g., barriers) of the permeable mass of filler material, the amount of alloy present in the reservoir could exceed such sufficient amount so that not only will there be a sufficient amount of alloy for complete infiltration, but excess molten metal alloy could remain and be attached to the metal matrix composite body. Thus, when excess molten alloy is present, the resulting body will be a complex composite body (e.g., a macrocomposite), wherein an infiltrated ceramic body having a metal matrix therein will be directly bonded to excess metal remaining in the reservoir.

Further improvements in metal matrix technology can be found in commonly owned and copending U.S. patent application Ser. No. 07/521,043, filed May 9, 1990, which is a continuation-in-part of U.S. patent application Ser. No. 07/484,753, filed Feb. 23, 1990, which is a continuation-in-part of U.S. patent application Ser. No. 07/432,661, filed Nov. 7, 1989 (and now abandoned), which is a continuation-in-part of U.S. patent application Ser. No. 07/416,327, filed Oct. 6, 1989 (and now abandoned), in the names of Aghajanian, et al., and entitled "A Method of Forming Metal Matrix Composite Bodies by a Spontaneous Infiltration Process, and Products Produced Therefrom". According to this Aghajanian, et al. invention, spontaneous infiltration of a matrix metal into a permeable mass of filler material or preform, at least at some point during the process, which permits molten matrix metal to spontaneously infiltrate the filler material or preform. Aghajanian, et al., disclose a number of matrix metal/infiltration enhancer precursor/infiltrating atmosphere systems which exhibit spontaneous infiltration. Specifically, Aghajanian, et al. disclose that spontaneous infiltration behavior has been observed in the aluminum/magnesium/nitrogen system; the aluminum/strontium/nitrogen system; the aluminum/zinc/oxygen system; and the aluminum/calcium/nitrogen system. However, it is clear from the disclosure set forth in the Aghajanian, et al., invention that the spontaneous infiltration behavior should occur in other matrix metal/infiltration enhancer precursor/infiltrating atmosphere systems.

A novel method of forming a metal matrix composite by infiltration of a permeable mass of filler contained in a ceramic matrix composite mold is disclosed in Commonly Owned U.S. Pat. No. 4,871,008, issued Oct. 3, 1989, which issued from U.S. patent application Ser. No. 07/142,385, filed Jan. 11, 1988, by Dwivedi et al., both entitled "Method of Making Metal Matrix Composites" (a European counterpart to U.S. Pat. No. 4,871,008 was published in the EPO on Jul. 19, 1989, as Publication No. 0,324,706). According to the method of the Dwivedi et al. invention, a mold is formed by the directed oxidation of a molten precursor metal or parent metal with an oxidant to develop or grow a polycrystalline oxidation reaction product which embeds at least a portion of a preform comprised of a suitable filler (referred to as a "first filler"). The formed mold of ceramic matrix composite is then provided with a second filler and the second filler and mold are contacted with molten metal, and the mold contents are hermetically sealed, most typically by introducing at least one molten metal into the entry or opening which seals the mold. The hermetically sealed bedding may contain entrapped air, but the entrapped air and the mold contents are isolated or sealed so as to exclude or shut-out the external or ambient air. By providing a hermetic environment, effective infiltration of the second filler at moderate molten metal temperatures is achieved, and therefore obviates or eliminates any necessity for wetting agents, special alloying ingredients in the molten matrix metal, applied mechanical pressure, applied vacuum, special gas atmospheres or other infiltration expedients.

The above-discussed commonly owned patent describes a method for the production of a metal matrix composite body, which may be bonded to a ceramic matrix composite body, and the novel bodies which are produced therefrom.

A method of forming macrocomposite bodies by a somewhat related process is disclosed in Commonly Owned and Copending U.S. patent application Ser. No. 07/484,575, filed on Feb. 23, 1990, in the names of Marc S. Newkirk et al., and entitled "Methods for Forming Macrocomposite Bodies and Macrocomposite Bodies Produced Thereby". This application is a continuation-in-part application of application Ser. No. 07/405,747, filed Sep. 11, 1989, in the names of Marc S. Newkirk et al., and entitled "Methods for Forming Macrocomposite Bodies and Macrocomposite Bodies Produced Thereby", which in turn is a continuation-in-part application of application Ser. No. 07/376,416, filed on Jul. 7, 1989, which is a continuation-in-part of U.S. patent application Ser. No. 07/368,564, filed on Jun. 20, 1989, which is in turn a continuation-in-part of U.S. patent application Ser. No. 07/269,464, filed on Nov. 10, 1988, all in the names of Marc S. Newkirk et al., and entitled "Methods for Forming Macrocomposite Bodies and Macrocomposite Bodies Produced Thereby" (a European counterpart to U.S. application Ser. No. 07/269,464 was published in the EPO on May 23, 1990, as Publication No. 0,369,931). These applications disclose various methods relating to the formation of macrocomposite bodies by spontaneously infiltrating a permeable mass of filler material or a preform with molten matrix metal and bonding the spontaneously infiltrated material to at least one second material such as a ceramic and/or a metal. Particularly, an infiltration enhancer and/or infiltration enhancer precursor and/or infiltrating atmosphere are in communication with a filler material or a preform, at least at some point during the process, which permits molten matrix metal to spontaneously infiltrate the filler material or preform. Moreover, prior to infiltration, the filler material or preform is placed into contact with at least a portion of a second material such that after infiltration of the filler material or preform, the infiltrated material is bonded to the second material, thereby forming a macrocomposite body.

A method of forming metal matrix composite bodies by a self-generated vacuum process similar to the process of the instant invention is disclosed in Commonly Owned and Copending U.S. patent application Ser. No. 07/381,523, filed on Jul. 18, 1989, in the names of Robert C. Kantner et al., and entitled "A Method of Forming Metal Matrix Composite Bodies by a Self-Generated Vacuum Process and Products Produced Therefrom". This patent application discloses a method whereby a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

A method of forming macrocomposite bodies by self-generated vacuum process, similar to the process of the instant invention, is disclosed in Commonly Owned and Copending U.S. patent application Ser. No. 07/560,746, filed Jul. 31, 1990, which is a Continuation-In-Part of U.S. patent application Ser. No. 07/383,953, filed Jul. 21, 1989, in the names of Robert C. Kantner et al., and entitled "A Method of Forming Macrocomposite Bodies by Self-Generated Vacuum Techniques and Products Produced Therefrom". This patent application discloses a method, whereby a molten matrix metal is contacted with a filler material or a preform or a second body in the presence of a reactive atmosphere, and at least at some point during the process, the molten matrix metal reacts, either partially or substantially completely, with the reactive atmosphere, thereby causing the molten matrix metal to infiltrate the filler material or preform contacting a second body due to, at least in part, the creation of a self-generated vacuum. Such self-generated vacuum infiltration occurs without the application of any external pressure or vacuum.

The entire disclosures of the above-described commonly owned patents and patent applications are expressly incorporated herein by reference.

DISCLOSURE OF THE INVENTION

The present invention relates to the unexpected discovery of a number of novel materials which can be utilized as tool materials for the thermoplastic formation of a number of different materials. Specifically, materials such as metals, ceramics, glasses, plastics, and polymers can be thermoplastically deformed under the appropriate process conditions. However, such thermoplastic deforming techniques place stringent requirements upon tools which are utilized for thermoplastic deformation.

This invention provides a number of novel materials for use as tools for various plastic formation processes. In particular, the ability to engineer the physical properties of the materials of the invention to meet various needs of the tooling industry provides significant advantages over tools previously known in the art. Physical characteristics including wear resistance, thermal conductivity, thermal expansion coefficient, etc., are all capable of being engineered in a manner which maximizes the potential for the materials of the invention to be utilized as tools.

Still further, because of the ability of the materials of the invention to be formed to net or near net shapes, many disadvantages of the prior art associated with the actual manufacture of tools are overcome.

The present invention satisfies a long felt need in the tooling industry for providing tools which can produce reliably, large numbers of formed or shaped products.

The present invention also provides for the ability to locate heating and/or cooling channels within selected locations within a tool to maximize the production of parts and/or the mechanical properties of parts produced by a tool.

Definitions

"Active Filler", as used herein, means fillers which provide nucleation sites and/or act as catalysts for ceramic matrix formation.

"Alloy Side" as used herein, in conjunction with ceramic matrix composite, refers to that side of the ceramic matrix composite which initially contacted molten metal before the oxidation reaction product of that molten metal and an oxidant infiltrated the preform or mass of filler material.

In conjunction with metal matrix composite, refers to that side of a metal matrix composite which initially contacted molten matrix metal before that molten metal infiltrated the permeable mass of filler material or preform.

"Aluminum", as used herein, means and includes essentially pure metal (e.g., relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Ambient Atmosphere", as used herein, refers to the atmosphere outside the filler material or preform and the impermeable container. It may have substantially the same constituents as the reactive atmosphere, or it may have different constituents.

"Balance Non-Oxidizing Gas", as used herein, means that any gas present in addition to the primary or oxidizing gas (if utilized) comprising the vapor-phase oxidant or infiltrating atmosphere that is either an inert gas or a reducing gas which is substantially non-reactive with the parent metal or matrix metal under the process conditions. Any oxidizing gas which may be present as an impurity in the gas(es) used should be insufficient to oxidize the parent metal or matrix metal to any substantial extent under the process conditions.

"Barrier" or "barrier means", as used herein in conjunction with ceramic matrix composite bodies, means any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Barrier" or "barrier means", as used herein, in conjunction with metal matrix composite bodies, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered non-functional as a barrier).

Further, suitable "barrier means" includes materials which are either wettable or non-wettable by the migrating molten matrix metal under the process conditions employed, so long as wetting of the barrier means does not proceed substantially beyond the surface of the barrier material (i.e., surface wetting). A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product.

"Bonded", as used herein, means any method of attachment between two bodies. The attachment may be physical and/or chemical and/or mechanical. A physical attachment requires that at least one of the two bodies, usually in a liquid state, infiltrates at least a portion of the microstructure of the other body. This phenomenon is commonly known as "wetting". A chemical attachment requires that at least one of the two bodies chemically react with the other body to form at least one chemical bond between the two bodies. One method of forming a mechanical attachment between the two bodies includes a macroscopic infiltration of at least one of the two bodies into the interior of the other body. An example of this would be the infiltration of at least one of the two bodies into a groove or slot on the surface of the other body. Such mechanical attachment does not include microscopic infiltration or "wetting" but may be used in combination with such physical attachment techniques.

An additional method of mechanical attachment includes such techniques as "shrink fitting", wherein one body is attached to the other body by a pressure fit. In this method of mechanical attachment, one of the bodies would be placed under compression by the other body.

"Bronze", as used herein, means and includes a copper rich alloy, which may include iron, tin, zinc, aluminum, silicon, beryllium, manganese and/or lead. Specific bronze alloys include those alloys in which the proportion of copper is about 90% by weight, the proportion of silicon is about 6% by weight, and the proportion of iron is about 3% by weight.

"Carcass" or "Parent Metal Carcass", as used herein, in conjunction with ceramic matrix composites, refers to any of the original body of parent metal remaining which has not been consumed during formation of the ceramic body, or the ceramic composite body, and typically, which remains in at least partial contact with the formed body. It should be understood that the carcass may also typically include some oxidized constituents of the parent metal and/or a second or foreign metal therein.

"Carcass" or "Carcass of Matrix Metal", as used herein, in conjunction with metal matrix composites, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Cast Iron", as used herein, refers to the family of cast ferrous alloys wherein the proportion of carbon is at least about 2% by weight.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1–40 percent by volume, but may include still more metal.

"Ceramic Matrix Composite" or "CMC" or "Ceramic Composite Body", as used herein, means a material comprising a two- or three-dimensionally interconnected ceramic which has embedded a preform or filler material, and may further include a parent metal phase embedded therein, possibly in a two- or three-dimensionally interconnected network. The ceramic may include various dopant elements to provide a specifically desired microstructure, or specifically desired mechanical, physical, or chemical properties in the resulting composite.

"Copper", as used herein, refers to the commercial grades of the substantially pure metal, e.g., 99% by weight copper with varying amounts of impurities contained therein. Moreover, it also refers to metals which are alloys or intermetallics which do not fall within the definition of bronze, and which contain copper as the major constituent therein.

"Dopants", as used herein, means materials (parent metal constituents or constituents combined with and/or included in or on a filler, or combined with the oxidant) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may be added to the filler material, they may be in the form of a gas, solid, or liquid under the process conditions, they may be included as constituents of the parent metal, or they may be added to any one of the constituents involved in the formation of the oxidation reaction product. Dopants may: (1) create favorable surface energy relationships which enhance or induce the wetting of the oxidation reaction product by the molten parent metal; and/or (2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product; and/or (3) cause microstructural modifications of the oxidation reaction product as it is formed or subsequently and/or alter the metallic constituent composition and properties of such oxidation reaction product; and/or (4) enhance growth nucleation and uniformity of growth of oxidation reaction product.

"Excess Matrix Metal" or "Residual Matrix Metal", as used herein, in conjunction with metal matrix composites, means that quantity or amount of matrix metal which remains after a desired amount of spontaneous infiltration into a filler material or preform has been achieved and which is intimately bonded to the formed metal matrix composite. The excess or residual matrix metal may have a composition which is the same as or different from the matrix metal which has spontaneously infiltrated the filler material or preform.

"Filler", as used herein, in conjunction with ceramic matrix composites, means either single constituents or mixtures of constituents which are substantially non-reactive with and/or of limited solubility in the parent metal) and/or oxidation reaction product and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and coated fillers such as carbon fibers coated with alumina or silicon carbide to protect the carbon from attack, for example, by a molten aluminum parent metal. Fillers may also include metals. For example, refractory metals such as tungsten, tantalum and molybdeum could be used as fillers.

"Filler", as used herein, in conjunction with metal matrix composites, is intended to include either single constituents or mixtures of constituents which are substantially non-reactive with and/or of limited solubility in the matrix metal and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum parent metal. Fillers may also include metals.

"Green", as used herein in conjunction with filler materials and preforms, refers to a filler material or preform before any growth of oxidation reaction product into the filler material or preform has occurred. Thus a filler material or preform that has been fired at an elevated temperature (for example, to volatilize a binder) should be considered to be "green" so long as the filler material or preform has not been infiltrated by either the parent metal or the oxidation reaction product.

"Growth Alloy", as used herein, in conjunction with ceramic matrix composites, means any alloy containing initially, or at some point during processing obtaining, a sufficient amount of requisite constituents to result in growth of oxidation reaction product therefrom. Growth alloy may differ from a parent metal in that the growth alloy may include constituents not present in the parent metal, but incorporated into the molten alloy during growth.

"Impermeable Container", as used herein, means a container which may house or contain a reactive atmosphere and a filler material (or preform) and/or molten matrix metal and/or a sealing means and/or at least a portion of at least one second material, under the process conditions, and which is sufficiently impermeable to the transport of gaseous or vapor species through the container, such that a pressure difference between the ambient atmosphere and the reactive atmosphere can be established.

"Infiltrating Atmosphere", as used herein, means that atmosphere which is present which interacts with the matrix metal and/or preform (or filler material) and/or infiltration enhancer precursor and/or infiltration enhancer and permits or enhances spontaneous infiltration of the matrix metal to occur.

"Infiltration Enhancer", as used herein, means a material which promotes or assists in the spontaneous infiltration of a matrix metal into a filler material or preform. An infiltration enhancer may be formed from, for example, a reaction of an infiltration enhancer precursor with an infiltrating atmosphere to form (1) a gaseous species and/or (2) a reaction product of the infiltration enhancer precursor and the infiltrating atmosphere and/or (3) a reaction product of the infiltration enhancer precursor and the filler material or preform. Moreover, the infiltration enhancer may be supplied directly to at least one of the preform, and/or matrix metal, and/or infiltrating atmosphere and function in a substantially similar manner to an infiltration enhancer which has formed as a reaction between an infiltration enhancer precursor and another species. Ultimately, at least during the spontaneous infiltration, the infiltration enhancer should be located in at least a portion of the filler material or preform to achieve spontaneous infiltration.

"Infiltration Enhancer Precursor" or "Precursor to the Infiltration Enhancer", as used herein, means a material which when used in combination with the matrix metal, preform and/or infiltrating atmosphere forms an infiltration enhancer which induces or assists the matrix metal to spontaneously infiltrate the filler material or preform. Without wishing to be bound by any particular theory or explanation, it appears as though it may be necessary for the precursor to the infiltration enhancer to be capable of being positioned, located or transportable to a location which permits the infiltration enhancer precursor to interact with the infiltrating atmosphere and/or the preform or filler material and/or metal. For example, in some matrix metal/ infiltration enhancer precursor/infiltrating atmosphere systems, it is desirable for the infiltration enhancer precursor to volatilize at, near, or in some cases, even somewhat above the temperature at which the matrix metal becomes molten. Such volatilization may lead to: (1) a reaction of the infiltration enhancer precursor with the infiltrating atmosphere to form a gaseous species which enhances wetting of the filler material or preform by the matrix metal; and/or (2) a reaction of the infiltration enhancer precursor with the infiltrating atmosphere to form a solid, liquid or gaseous infiltration enhancer in at least a portion of the filler material or preform which enhances wetting; and/or (3) a reaction of the infiltration enhancer precursor within the filler material or preform which forms a solid, liquid or gaseous infiltration enhancer in at least portion of the filler material or preform which enhances wetting.

"Liquid-Phase Oxidant" or "Liquid Oxidant", as used herein, in means an oxidant in which the identified liquid is the sole, predominant or at least a significant oxidizer of the parent or precursor metal under the conditions of the process.

Reference to a liquid oxidant means one which is a liquid under the oxidation reaction conditions. Accordingly, a liquid oxidant may have a solid precursor, such as a salt, which is molten at the oxidation reaction conditions. Alternatively, the liquid oxidant may have a liquid precursor (e.g., a solution of a material) which is used to impregnate part or all of the filler and which is melted or decomposed at the oxidation reaction conditions to provide a suitable oxidant moiety. Examples of liquid oxidants as herein defined include low melting glasses.

If a liquid oxidant is employed in conjunction with the parent metal and a filler, typically, the entire bed of filler, or that portion comprising the desired ceramic body, is impregnated with the oxidant (e.g., by coating or immersion in the oxidant).

"Macrocomposite" or "Macrocomposite Body", as used herein, means any combination of two or more materials selected from the group consisting of a ceramic body, a ceramic matrix composite body, a metal body, and a metal matrix composite body, which are intimately bonded together in any configuration, wherein at least one of the materials comprises a metal matrix composite body formed by a self-generated vacuum technique or by a spontaneous infiltration technique, or a ceramic matrix composite body formed by a directed oxidation technique. The metal matrix composite body or ceramic matrix composite body may be present as an exterior surface and/or as an interior surface. Further, the metal matrix composite body or the ceramic matrix composite body may be present as an interlayer between two or more of the materials in the group described above. It should be understood that the order, number, and/or location of a metal matrix composite body or a ceramic matrix composite body, or bodies relative to residual matrix metal or parent metal and/or any of the materials in the group discussed above, can be manipulated or controlled in an unlimited fashion.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Matrix Metal/Infiltration Enhancer Precursor/Infiltrating Atmosphere System" or "Spontaneous System", as used herein, refers to that combination of materials which exhibits spontaneous infiltration into a preform or filler material. It should be understood that whenever a "/" appears between an exemplary matrix metal, infiltration enhancer precursor and infiltrating atmosphere that, the "/" is used to designate a system or combination of materials which, when combined in a particular manner, exhibits spontaneous infiltration into a preform or filler material.

"Metal Matrix Composite" or "MMC", as used herein means a material comprising a two- or three-dimensionally interconnected alloy or matrix metal which has embedded a preform or filler material. The matrix metal may include various alloying elements to provide specifically desired mechanical and physical properties in the resulting composite.

"Nitrogen-Containing Gas Oxidant", as used herein, means a particular gas or vapor in which nitrogen is the sole, predominant or at least a significant oxidizer of the parent or precursor metal under the conditions existing in the oxidizing environment utilized. The nitrogen could be molecular nitrogen (i.e., $N_2$) or could be contained in a compound such as $NH_3$.

"Nonreactive Vessel for Housing Matrix Metal" means any vessel which can house or contain molten matrix metal under the process conditions and not react with the matrix and/or the infiltrating atmosphere and/or infiltration enhancer precursor and/or filler material or preform in a manner which would be significantly detrimental to the spontaneous infiltration mechanism.

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, any halogen or a combination thereof, sulphur, phosphorus, arsenic, carbon, boron, selenium, tellurium, and or compounds and combinations thereof, for example, silica or silicates (as sources of oxygen), methane, ethane, propane, acetylene, ethylene, propylene (the hydrocarbon as a source of carbon), and mixtures such as air, $H_2/H_2O$ and $CO/CO_2$ (as sources of oxygen). The latter two (i.e., $H_2/H_2O$ and $CO/CO_2$) being useful in reducing the oxygen activity of the environment.

"Oxidation", as used herein means a chemical reaction in which an oxidant reacts with a parent metal, and that parent metal has given up electrons to or shared electrons with the oxidant.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of the reaction of one or more metals with one or more oxidants.

"Oxygen-Containing Gas Oxidant", as used herein, means a particular gas or vapor in which oxygen is the sole, predominant or at least a significant oxidizer or the parent or precursor metal under the conditions existing in the oxidizing environment utilized.

"Parent Metal", as used herein, means that metal(s) (e.g., aluminum, silicon, titanium, tin and/or zirconium) which is the precursor of a polycrystalline oxidation reaction product (e.g., oxides, parent metal borides, or other parent metal boron compounds, etc.) and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, zirconium, etc.), the metal identified should be read with this definition in mind unless indicated otherwise by the context.

A Metal "Different" from the parent metal means a metal which does not contain, as a primary constituent, the same metal as the parent metal (e.g., if the primary constituent of the parent metal is aluminum, the "different" metal could have a primary constituent of, for example, nickel).

"Parent metal boride" and "parent metal boron compounds" mean a reaction product containing boron formed upon reaction between boron carbide and the parent metal and includes a binary compound of boron with the parent metal as well as ternary or higher order compounds.

"Parent Metal Powder" as used herein, means that metal (e.g., zirconium, titanium, hafnium, etc.) which is the precursor for a reaction product of the powdered parent metal and a solid oxidant (e.g., parent metal carbides, etc.) and includes that metal as a pure or relatively pure metal, a commercially available metal having impurities and/or alloying constituents therein and an alloy in which that metal precursor is the major constituent. When a specific metal is mentioned as the powdered parent metal, the metal identified should be read with this definition in mind unless indicated otherwise by the context.

"Parent Metal Vapor" or "Vapor-Phase Parent Metal" as used herein, means that metal (e.g., zirconium, titanium, hafnium) which is the vapor-phase precursor for the reaction product (e.g., parent metal carbides, etc.) of the parent metal and a solid oxidant and includes that metal as a pure or relatively pure metal, a commercially available metal having impurities and/or alloying constituents therein and an alloy in which that metal precursor is the major constituent. When a specific metal is mentioned as the powdered parent metal, the metal identified should be read with this definition in mind unless indicated otherwise by the context.

"Preform" or "Permeable Preform", as used herein, means a porous mass of filler or filler material which is manufactured with at least one surface boundary which essentially defines a boundary for infiltrating matrix metal or oxidation reaction product, such mass retaining sufficient shape integrity and green strength to provide dimensional fidelity without any external means of support prior to being infiltrated by the matrix metal or the oxidation reaction product. The mass should be sufficiently porous to permit infiltration of the matrix metal or the oxidation reaction product. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Product Releasers", as used herein, means materials that facilitate the release of the ceramic matrix composite from the parent metal carcass after growth is substantially completed.

"Reaction System", as used herein, refers to that combination of materials which exhibit self-generated vacuum infiltration of a molten matrix metal into a filler material or preform. A reaction system comprises at least an impermeable container having therein a permeable mass of filler material or preform, a reactive atmosphere and a matrix metal.

"Reactive Atmosphere", as used herein, means an atmosphere which may react with the matrix metal and/or filler material (or preform) and/or impermeable container to form a self-generated vacuum, thereby causing molten matrix metal to infiltrate into the filler material (or preform) upon formation of the self-generated vacuum.

"Reactive Filler" means that the filler interacts with molten parent metal or molten matrix metal (e.g., is reduced by the parent metal and/or oxidation reaction product and thus modifies the composition of the parent metal and/or provides an oxidant for formation of the oxidation reaction product).

"Reservoir", as used herein, in conjunction with ceramic matrix composites, means a separate body of parent metal positioned relative to a mass of filler or a preform so that, when the metal is molten, the reservoir may flow to replenish, or in some cases to initially provide and subsequently replenish, that portion, segment or source of parent metal which is in contact with the filler or preform and infiltrating and/or reacting to form the oxidation reaction product. The reservoir may also be used to provide a metal which is different from the parent metal.

"Reservoir", as used herein, in conjunction with metal matrix composites, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Seal" or "Sealing Means", as used herein, refers to a gas-impermeable seal under the process conditions, whether formed independent of (e.g., an extrinsic seal) or formed by the reaction system (e.g., an intrinsic seal), which isolates the ambient atmosphere from the reactive atmosphere. The seal or sealing means may have a composition different from that of the matrix metal.

"Seal Facilitator", as used herein, is a material that facilitates formation of a seal upon reaction of the matrix metal with the ambient atmosphere and/or the impermeable container and/or the filler material or preform. The material may be added to the matrix metal, and the presence of the seal facilitator in the matrix metal may enhance the properties of the resultant composite body.

"Second or Foreign Metal", as used herein, means any suitable metal, combination of metals, alloys, intermetallic compounds, or sources of either, which is, or is desired to be, incorporated into the metallic component of a formed ceramic composite body in lieu of, in addition to, or in combination with unoxidized constituents of the parent metal. This definition includes intermetallic compounds, alloys, solid solutions or the like formed between the parent metal and a second metal.

"Second Body" or "Additional Body", as used herein, means another body which is capable of being bonded to a metal matrix composite body by at least one of a chemical reaction and/or a mechanical or shrink fit. Such a body includes traditional ceramics such as sintered ceramics, hot pressed ceramics, extruded ceramics, etc., and also, non-traditional ceramic and ceramic composite bodies such as those produced by the methods described in Commonly Owned U.S. Pat. No. 4,713,360, which issued Dec. 15, 1987, in the names of Marc S. Newkirk et al.; Commonly Owned U.S. patent application Ser. No. 819,397, filed Jan. 17, 1986, in the names of Marc S. Newkirk et al., and entitled "Composite Ceramic Articles and Methods of Making Same", now allowed; Commonly Owned and Copending U.S. patent application Ser. No. 861,025, filed May 8, 1986, in the names of Marc S. Newkirk et al., and entitled "Shaped Ceramic Composites and Methods of Making the Same"; Commonly Owned U.S. patent application Ser. No. 152,518, filed on Feb. 5, 1988, in the names of Robert C. Kantner et al., and entitled "Method For In Situ Tailoring the Metallic Component of Ceramic Articles and Articles Made Thereby", now allowed; Commonly Owned and Copending U.S. application Ser. No. 137,044, filed Dec. 23, 1987, in the names of T. Dennis Claar et al., and entitled "Process for Preparing Self-Supporting Bodies and Products Made Thereby"; and variations and improvements on these processes contained in other Commonly Owned Allowed and Copending U.S. Applications. For the purpose of teaching the method of production and characteristics of the ceramic and ceramic composite bodies disclosed and claimed in these commonly owned applications, the entire disclosures of the above-mentioned applications are hereby incorporated by reference. Moreover, the second or additional body of the instant invention also includes metal matrix composites and structural bodies of metal such as high temperature metals, corrosion resistant metals, erosion resistant metals, weldable metals, solderable metals, etc. Accordingly, a second or additional body includes a virtually unlimited number of bodies.

"Second Material", as used herein, refers to a material selected from the group consisting of a ceramic matrix body, a ceramic matrix composite body, a metal body, and a metal matrix composite body.

"Solid Oxidant" as used herein in conjunction with the formation of coatings on a substrate, means an oxidant in which the identified solid is the sole, predominant, or at least a significant oxidizer of, for example, a parent metal vapor under the conditions of the process.

"Solid Oxidant-Containing Material" as used herein in conjunction with the formation of coatings on a substrate, means a material which contains a solid oxidant. The solid oxidant may comprise substantially all of the material or may comprise only a portion of the material. The solid oxidant may be substantially homogeneously or heterogeneously located within the material.

"Solid Oxidant Powder" as used herein in conjunction with the formation of coatings on a substrate, means an oxidant in which the identified solid is the sole, predominant, or at least a significant oxidizer of a parent metal powder and/or parent metal vapor and which is located on at least a portion of a surface of another material (e.g., a solid oxidant-containing material).

"Solid-Phase Oxidant" or "Solid Oxidant", as used herein, means an oxidant in which the identified solid is the sole, predominant or at least a significant oxidizer of the parent or precursor metal under the conditions of the process. When a solid oxidant is employed in conjunction with the parent metal and a filler, it is usually dispersed throughout the entire bed of filler or that portion of the bed into which the oxidation reaction product will grow, the solid oxidant being, for example, particulates admixed with the filler or coatings on the filler particles. Any suitable solid oxidant may be thus employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal, the resulting oxidation reaction product comprises aluminum boride.

In some instances, the oxidation reaction of the parent metal may proceed so rapidly with a solid oxidant that the oxidation reaction product tends to fuse due to the exothermic nature of the process. This occurrence can degrade the microstructural uniformity of the ceramic body. This rapid exothermic reaction can be ameliorated by mixing into the composition relatively inert fillers which absorb the excess heat. An example of such a suitable inert filler is one which is identical, or substantially identical, to the intended oxidation reaction product.

"Spontaneous Infiltration", as used herein, means that the infiltration of matrix metal into the permeable mass of filler or preform occurs without requirement for the application of pressure or vacuum (whether externally applied or internally created).

"Vapor-Phase Oxidant", as used herein, means an oxidant which contains or comprises a particular gas or vapor and further means an oxidant in which the identified gas or vapor is the sole, predominant or at least a significant oxidizer of the parent or precursor metal under the conditions obtained in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "Oxygen-Containing Gas Oxidant" but not within the definition of a "Nitrogen-Containing Gas Oxidant" (an example of a "nitrogen-containing gas" oxidant is forming gas, which typically contains about 96 volume percent nitrogen and about 4 volume percent hydrogen) as those terms are used herein and in the claims.

"Weight Gain", as used herein, means the percentage weight gain of the ingot/filler combination with respect to the weight of the ingot alone before initiation of the oxidation reaction. The weight gain can therefore be calculated by measuring the weight of the ingot/filler after growth, subtracting the weight of the ingot/filler before growth dividing by the weight of the ingot before growth and multiplied by 100.

"Wetting Enhancer", as used herein, refers to any material, which when added to the matrix metal and/or the filler material or preform, enhances the wetting (e.g., reduces surface tension of molten matrix metal) of the filler material or preform by the molten matrix metal. The presence of the wetting enhancer may also enhance the properties of the resultant metal matrix composite body by, for example, enhancing bonding between the matrix metal and the filler material.

BEST MODES FOR CARRYING OUT THE INVENTION

Figure 1:
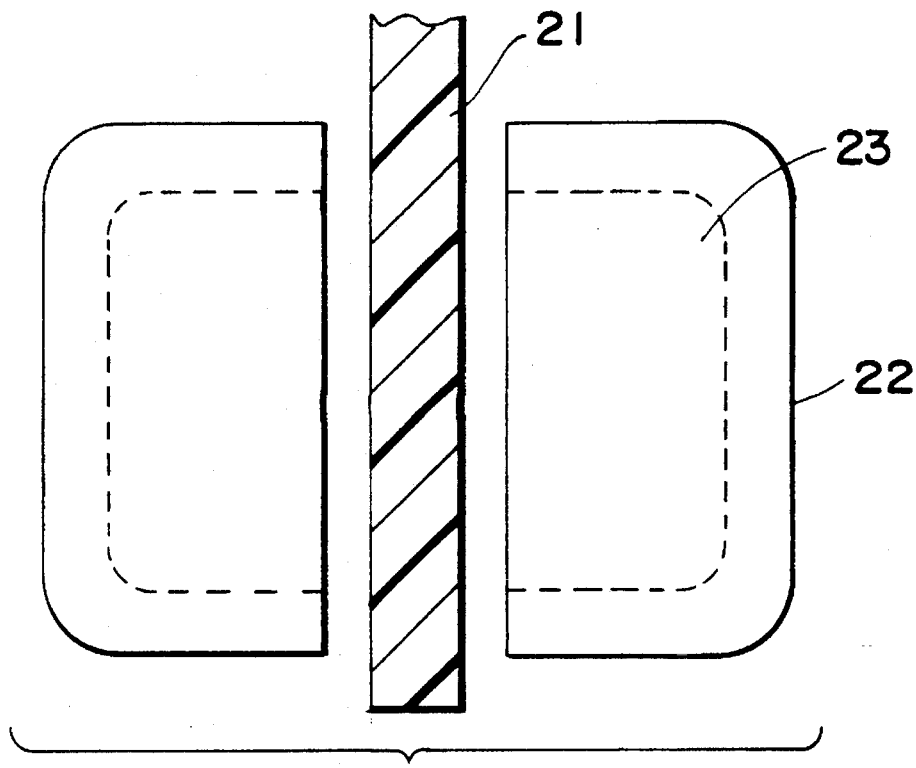
FIG. 1 is a schematic cross-sectional view of a blow molding tool which can be manufactured in accordance with the present invention.

In accordance with the present invention, there are provided a plurality of novel methods for forming novel tools from novel tool materials. In each of these methods, specific desirable aspects of the formation methods, as well as advantages attendant the resultant tool material, should become readily apparent.

This application focuses primarily upon tools for use in thermoplastic formation processes, however, it should be noted that tools of similar shape and/or composition and/or nature could be made by substantially similar techniques and used in other plastic formation processes including plastic formation of metals, ceramics, glasses, etc. Thus, while specific focus is directed to thermoplastic formation techniques, the scope of the claims appended hereto should not be interpreted as being limited only to heated plastic or polymer formation techniques.

In a first preferred embodiment of the invention, a tool for a plastic formation process is manufactured from a metal matrix composite body. The formation process for making the tool can be any suitable metal matrix composite formation process including, in specific preferred embodiments of the invention, the spontaneous infiltration and self-generated vacuum metal matrix composite formation techniques discussed in the Commonly Owned Patents and Patent Applications discussed above herein and incorporated by reference herein.

When tools are manufactured by the above-discussed metal matrix composite formation techniques, the formed tools will have significant advantages over tools known in the art. For example, by utilizing the teachings of the above-discussed Commonly Owned Metal Matrix Patents and Patent Applications, tools can be engineered to exhibit a coefficient of thermal expansion which is compatible with products which are to be manufactured in, on or from the tool. The matching of the coefficient of thermal expansion of the tool to the coefficient of thermal expansion of the formed product is an important aspect of the invention because it permits parts having complex shapes to be produced reliably from metal matrix composite tools. Further, these formed tools can be made to net or near net shape due to the ability to infiltrate a matrix metal into a preshaped mass of filler material or into a preform of filler material. The ability to make net or near net shapes is important because no complex machining of, for example, metal parts is required. Additionally, there are shortened tooling lead times required for making the tools because of the ability of simple molds to be made from master parts, the molds thereafter being capable of being filled with a filler material and infiltrated with a matrix metal. Alternatively, molds can be utilized to form preforms of filler material which are thereafter coated with barrier materials and the coated preform of filler material is infiltrated by molten matrix metal.

Still further, the ability to select particular compositions and/or particle size distributions, etc., of filler materials, enable tools made according to the present invention to have, for example, controlled thermal conductivity, controlled wear resistance, high stiffness characteristics, etc. Thus, by choosing a particular composition, size distribution, grading, etc., of filler materials, in combination with appropriate choices of matrix metals, metal matrix composite tools can be manufactured to have properties which are highly desirable for use in thermoplastic forming processes. For example, by causing a tool to have a very high thermal conductivity, the thermal management of thermoplastically formed bodies can be enhanced. Specifically, faster cycle times for the manufacturing of parts from tools can result from tools manufactured to have relatively high thermal conductivities.

Still further, by appropriate selection of a combination of filler materials and matrix metal, metal matrix composite tools can operate at relatively high temperatures resulting in the ability to form parts of even more desirable properties. Still further, in contrast to, for example, tooling steels, metal matrix composite tooling materials can be made to be about 60 percent lighter than typical tooling steels while maintaining stiffnesses at least as great as that of tooling steels, and in some cases exhibit stiffness much greater than stiffnesses of tooling steels.

In another preferred embodiment of the invention, specific cooling or heating channels can be designed into specific desirable areas of tool materials. In this regard, in some cases, when a thermoplastic material is plastically deformed, either by injection molding, compression molding, etc., it may be desirable for the tool material to be locally heated or cooled in certain areas to enhance, for example, the surface finish, mechanical properties, etc., of a formed part. In some cases, it may be desirable for the cooling and/or heating channels to be formed of a material of different composition than the metal matrix composite body. In this instance, a macrocomposite body can be formed. The macrocomposite body can be formed in accordance with the teachings in the above-discussed Commonly Owned Metal Matrix Composite Patent and Patent Applications.

In another preferred embodiment of the invention, tooling materials can be made from ceramic matrix composite bodies. Specifically, the above-discussed Commonly Owned Ceramic Matrix Patents and Patent Applications can also be utilized to manufacture tooling materials. Many of the above-discussed advantages attendant to metal matrix composite bodies also are applicable in tooling materials made from ceramic matrix composite bodies. Specifically, specific combinations of filler materials, parent metals (and thus, the resulting oxidation reaction product) can be selected in an appropriate manner to achieve, for example, desirable thermal expansion coefficient, wear resistance, stiffness, strength, high temperature strength, and thermal conductivity. Moreover, the ability to make net or near net shaped ceramic matrix composite tools is also an advantage of these formation methods.

Still further, macrocomposite bodies can be formed in ceramic matrix composite bodies as well. In this embodiment, cooling and/or heating channels may also be incorporated into the formed tool, thereby forming a macrocomposite body.

In a still further preferred embodiment of the invention, surface coatings may be placed onto at least a portion of a surface of a substrate material to enhance the ability of the substrate material to function as a tool. For example, graphite materials have historically been utilized in some tooling applications. However, while graphite has some desirable tooling aspects (e.g., good thermal conductivity and machinability), many forms of graphite are relatively prone to rapid wear and physical damage from, for example, normal handling procedures. Additionally, some graphite materials are too porous to function as tool materials (e.g., in vacuum formation processes hermaticity of the tool is essential). However, if these types of materials could be coated with a material which enhances, for example, the wear resistance of the tool, the hermiticity of the tool, etc., then the tool may be made to be suitable for use as a tool or may provide for enhanced performance of a tool. In a preferred embodiment of the invention, a graphite tool substrate can be coated with a reaction product coating which may be formed from a reaction between a vapor-phase parent metal and a solid oxidant, said solid oxidant being capable of being separately coated onto a surface of a substrate or contained within at least a portion of the substrate. The manner for forming such reaction product coatings is discussed in the above-mentioned Copending and Commonly Owned Ceramic Matrix Patents and Patent Applications.

Moreover, in another preferred embodiment, a ceramic matrix composite material can be formed as a surface coating on at least a portion of a substrate material. In this embodiment, a coating can be made in a manner similar to that manner discussed immediately above herein, however, in addition, a filler material may be located on at least a portion of a substrate material. Moreover, a powdered parent metal and/or vapor-phase parent metal and/or solid oxidant can be conjoined under the process conditions to result in a coating on at least a portion of a surface of a substrate material.

In each of the above-discussed preferred embodiments relating to the formation of coatings on a substrate material, the resultant coating can be formed so that it enhances the wear properties, as well as the hermeticity, of the underlying substrate material. However, it should be understood that these coatings may also enhance the performance of the above-discussed metal matrix composite tools as well as the above-discussed ceramic matrix composite tools.

Moreover, the specific technique for coating surfaces of a substrate material should not be limited to the above-discussed Commonly Owned and Copending Ceramic Matrix Patent and Patent Applications. Specifically, it is possible that desirable coatings on substrate materials can be achieved by various techniques including the deposition of overlay coatings by, for example, chemical vapor deposition, hot spraying, physical vapor deposition, etc. Moreover, a number of hot spraying techniques also exist for the placement of overlay coatings on a substrate material. Three commonly used hot spraying techniques include flame spraying, plasma spraying and detonation coating. Still further, conversion coating techniques can also be utilized to form desirable coatings on the surface of substrate materials which are to be utilized as tools. Pack cementation and slurry cementation are commonly known examples of methods for placing coatings on substrate materials. The precise combination of composition, thickness, coefficient of thermal expansion, thermal properties, etc., of these coatings need to be selected based upon the particular intended application of the tool.

In each of the above-discussed preferred embodiments, it may be desirable to design a surface of a tool so that a desirable surface texture on a formed part will result. For example, in certain applications such as plastic part formation operations, it may be desirable for the formed part to have a leather-like texture. In this case, matrix metal from metal matrix composite tools or parent metal from ceramic matrix composite tools could be selectively removed from at least a portion of a surface of a tool so that the filler material (e.g., coarse particles) could protrude from at least a portion of the surface and thus create their own unique surface texture in parts formed therefrom. This technique could be utilized in selected regions of a tool or over the entire tool to obtain a desirable surface texture.

Moreover, in each of the above-discussed preferred embodiments, controlling the laminar flow of an injected plastic material into a mold or tool may permit a more rapid filling of a mold or tool cavity relative to a mold or tool cavity which does not have such interference with laminar flow. For example, in a specifically preferred embodiment of the invention, surface bumps (e.g., a few microns high) in spurs or gates (such as those spurs or gates which are normal pathways in tooling through which thermoplastic materials are passed on their way into a mold cavity) may result in the introduction of a turbulence where an injected plastic material contacts the wall or sprue of such gates. The introduction of turbulence will have the effect of reducing drag on the thermoplastic material which is injected, thus reducing laminar adhesion and enhancing the manufacture of the parts.

FIGS. 1–6 of the application show various exemplary uses for tools. In each of the figures, similar reference numerals have been used wherever possible when reference is made to like portions in each figure. In each of the figures, the numeral 21 references a material which is to be deformed (e.g., a plastic or a polymer); the numeral 22 references a tool; and the numeral 23 references a cavity into which the thermoplastic material is to be deformed.

With specific reference to FIG. 1, a cross-section of a blow molding tool is disclosed. In this embodiment, the tool halves 22 clamp around the material 21 which is to be deformed and a positive pressure is applied to an interior portion of the material 21 causing it to fill the cavity 23, thereby conforming to the shape of the cavity 23. The mold is thereafter opened and the formed part is removed.

Figure 2:
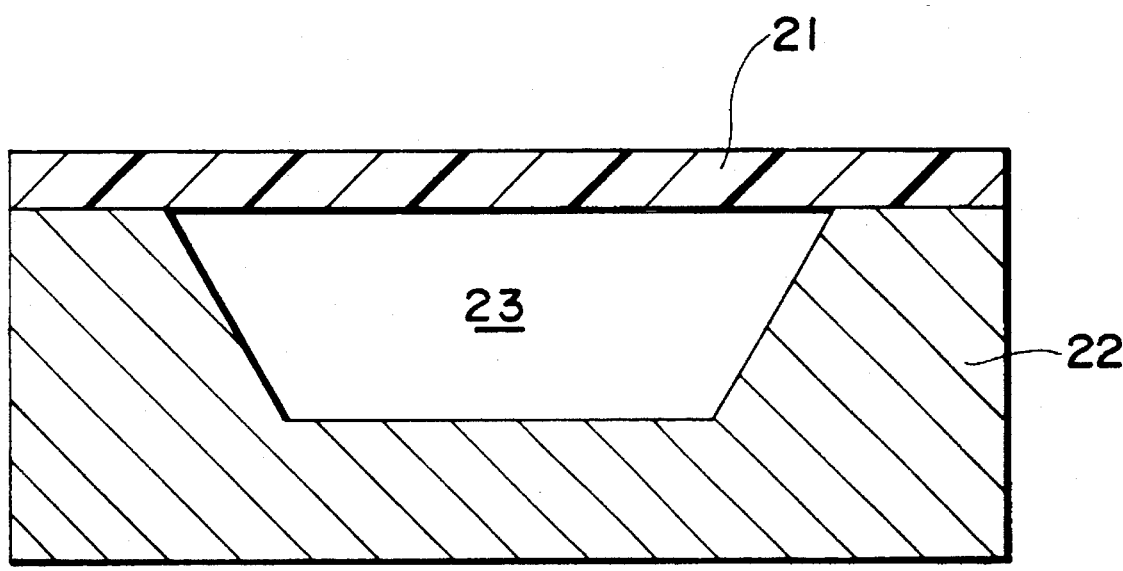
FIG. 2 is a schematic cross-sectional view of a vacuum forming tool which can be made in accordance with the present invention.

FIG. 2 shows a schematic cross-sectional view of a vacuum forming tool. In this figure, a vacuum is created, by any appropriate means, within the cavity 23. The thermoplastically deformable material 21 then assumes the shape of the cavity 23 within the tool 22.

Figure 3:
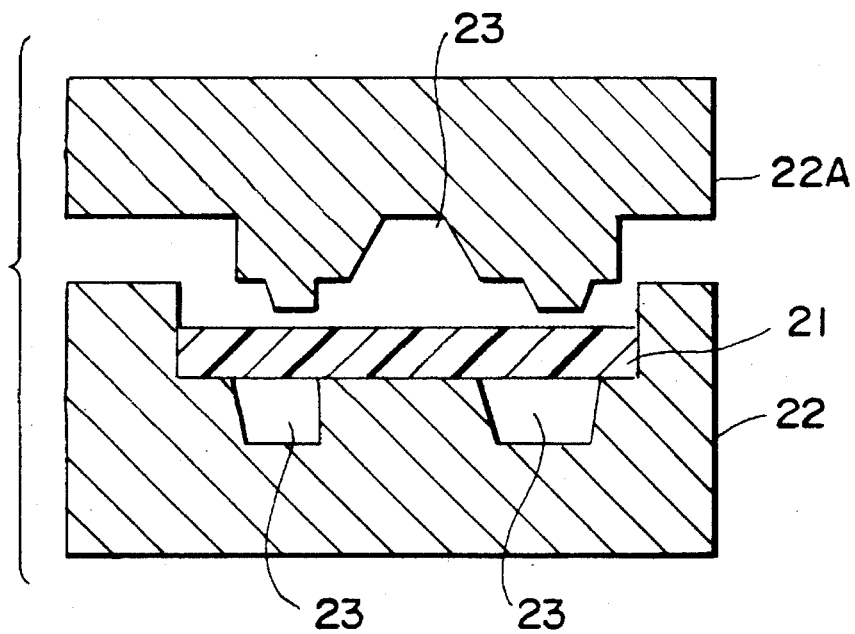
FIG. 3 is a schematic cross-sectional view of a compression molding tool which can be made in accordance with the present invention.

A compression molding tool is shown in schematic cross-section in FIG. 3. In this tool 22, cavities 23 are formed into which the thermoplastically deformable material 21 is caused to flow when the tool portions 22 and 22A are pressed together.

Figure 4:
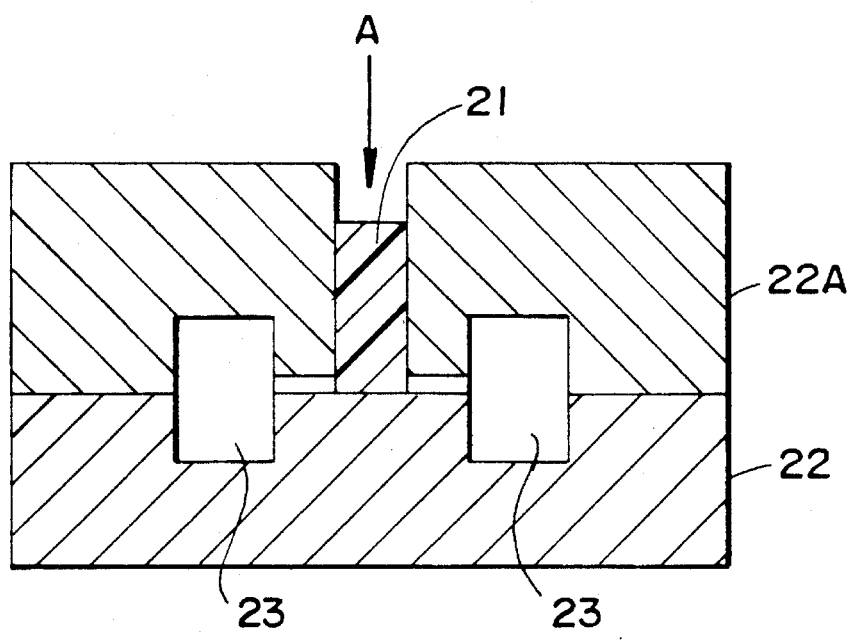
FIG. 4 is a schematic cross-sectional view of a transfer molding or injection molding tool which can be made in accordance with the present invention.

FIG. 4 shows a schematic cross-sectional view of a transfer molding or injection molding tool. In this embodiment, a thermoplastically deformable material 21 is pressured by an appropriate force "A" to cause it flow into the cavity portion 23 created by the tool parts 22 and 22A. The resultant body accordingly conforms to the shape of the cavities 23.

Figure 5:
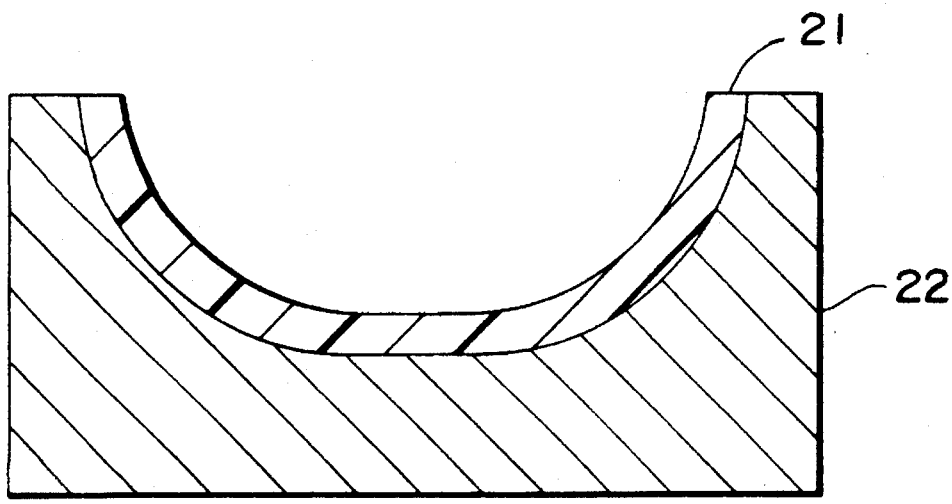
FIG. 5 is a schematic cross-sectional view of a lay-up tool which can be made in accordance with the present invention.

A typical lay-up tool is shown in cross-section in FIG. 5. In this embodiment, a material 21, which may or may not be thermoplastically deformable, is placed into contact with the tool 22 as shown. Specific materials for use as the material 21 include various films or film laminates such as "prepregs" (e.g., combinations of various filler materials and organic resin binders). The tool 22, containing the material coating 21, may thereafter be placed into, for example, an autoclave causing the, for example, prepreg material to solidify and take the shape of the tool.

Figure 6:
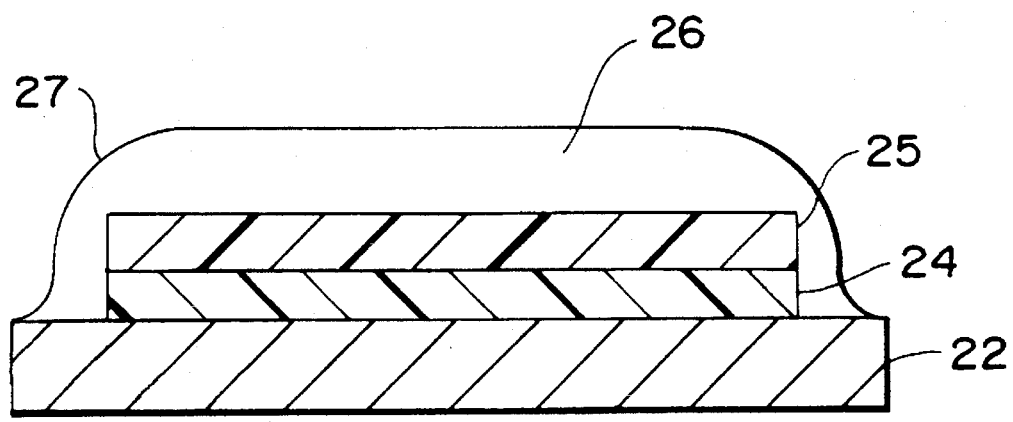
FIG. 6 is a schematic cross-sectional view of a vacuum lay-up tool which can be made in accordance with the present invention.

FIG. 6 shows in schematic cross-sectional view the vacuum lay-up tool which can utilize materials of the present invention. In this embodiment, materials such as those discussed immediately above (i.e., prepregs, etc.) referenced here by the numerals 24 and 25, can be placed into contact with the surface of the tool 22 and covered by a vacuum bag 27 thereby forming a cavity 26 between the materials 24, 25, the vacuum bag 27, and the tool 22. A vacuum is then applied inside the vacuum bag 27 so as to cause the vacuum bag 27 to substantially eliminate the cavity 26 (i.e., the vacuum bag 27 is caused to contact a substantial portion of the surface of the materials 24 and 25. Additionally, temperature can be applied simultaneously with the vacuum to cause the materials 24 and 25 to solidify to form a part conforming to the tool 22.

In each of exemplary embodiments contained in FIGS. 1–6, the tool material 22 is made of materials according to the present invention. Accordingly, the tool materials exhibit enhanced performance in areas such as better wear resistance, better thermal conductivity, rapid production times, etc.

It is noted that the use of cooling channels and/or protuberances are not expressly disclosed in any of FIGS. 1–6. However, for example, in reference to FIG. 2, a cooling channel could be located within the tool 22 adjacent to cavity portion 23. Such cooling channel could result in more rapid solidification of a thermoplastically deformed material relative to a similar tool which could not include a cooling channel.

Moreover, in reference to FIG. 4, a means to interfere with the laminar flow of the thermoplastically deformable material 21 could be located somewhere within the channel through which thermoplastically deformable material 21 flows (e.g., either in throat of the tool or in the internal feed cavities within the tool). The placement of these laminar control flow means as well as the shape (e.g., cross-section) depends upon the type of thermoplastic material utilized to form a part as well as the rate at which deformation occurs.

The following contain Examples of the present invention, however, the Examples, as well as the above-discussed preferred embodiments, should not be construed as limiting the scope of the invention as defined by the attached claims.

Example 1

Figure 7A:
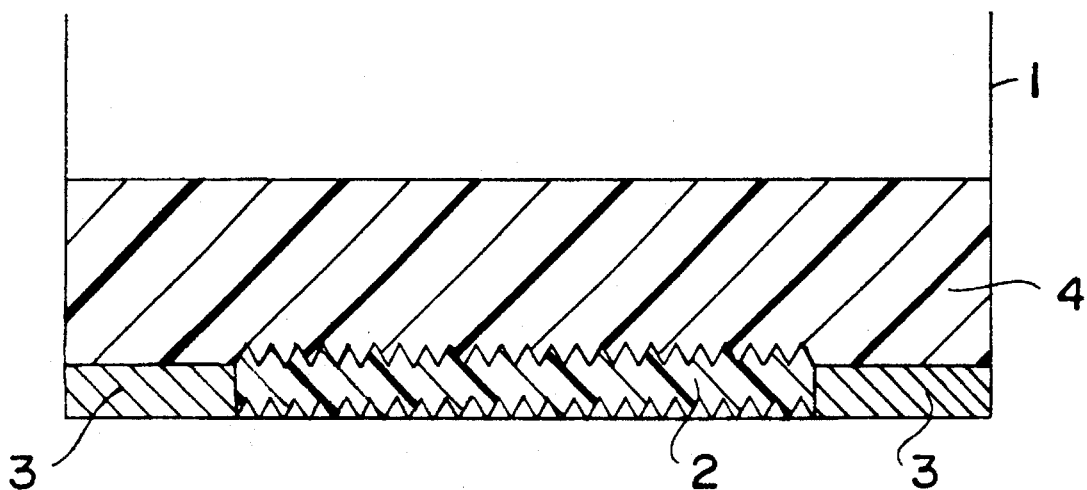
FIGS. 7A and 7B are schematic cross-sectional views of the first step in making a mold for the formation of a metal matrix composite tool in accordance with Example 1.
Figure 7B:
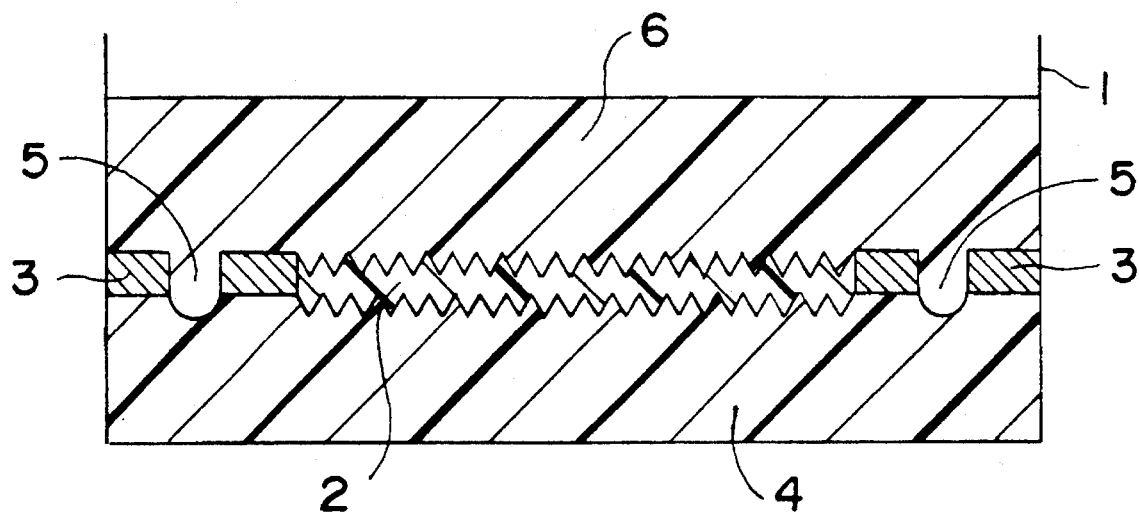

This Example demonstrates a method of manufacturing metal matrix composite lens tools. Specifically, a plaster molding mixture comprising about 60% by weight USG-1 Industrial Plaster (Samuel H. French, Philadelphia, Pa.) and 40% by weight room temperature tap water was prepared. As shown in FIG. 7A, a lens model 2 was placed in the bottom of a container 1. A wax layer 3 was built up around the lens model to a level substantially flush with the top of the lens model 2. The plaster mixture 4 was then poured into the container 1 and onto the lens model 2 surrounded by the wax layer 3. The plaster mixture 4 was allowed to cure in the container 1 for at least 2 hours. The plaster/wax/lens model assembly was removed from the container, inverted, and repositioned in the container 1 such that the plaster layer 4 contacted the bottom of the container 1. As shown in FIG. 7B, four holes 5, each about ¾ inch (1.9 cm) in diameter, were drilled through the wax layer 3 and just into the plaster layer 4 to make indentations at the corners. The indentations were then coated with a thin layer of COLLOID 581-B defoamer (Colloids, Inc., Newark, N.J.) to act as a releasing agent. A fresh plaster molding mixture 6, having a composition as described above, was then poured into the container 1 and onto the inverted plaster/wax/lens model assembly. The plaster mixture 6 was allowed to cure in the container 1 for at least 2 hours. The plaster parts 4 and 6 were then removed from the container 1, separated from the wax layer 3 and lens model 2, and placed into an air circulating oven at about 32° C. and allowed to dry about 24 hours.

Figure 8A:
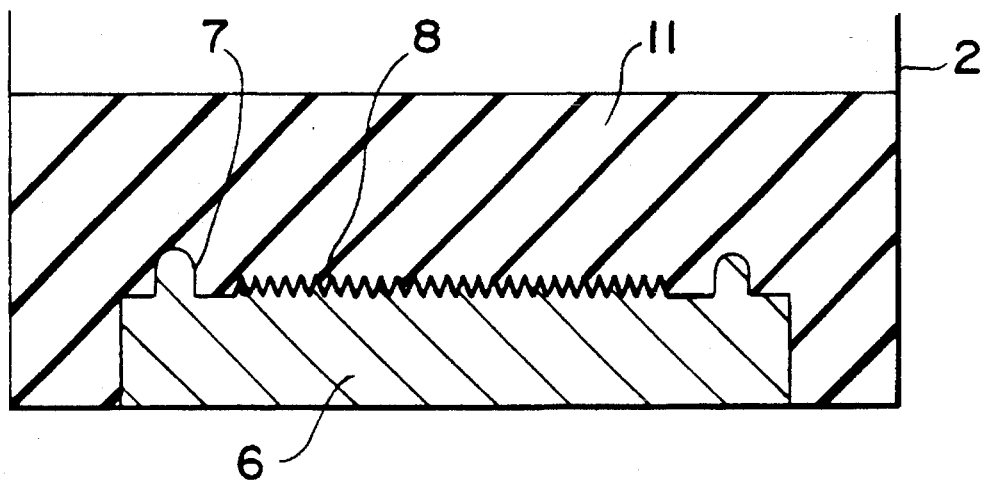
FIGS. 8A and 8B are schematic cross-sectional views of the method for making a rubber mold which will utilized to make a mold for making the tool in accordance with Example 1.

As shown in FIG. 8A, the male plaster lens tool model 6, having a serrated cross-section 8 and alignment pins 7, was placed within a container 2 with the flat side of the plaster lens tool model 6 contacting the bottom surface of the container 2 and the serrated cross-section 8 and alignment pins 7 facing up. A rubber molding compound (GI-1000, Plastic Tooling Supply Co., Easton, Pa., about 1 part by weight activator and about 10 parts by weight rubber base) was poured into the container 2 and onto the male plaster lens tool model 6. The rubber mold 11 was allowed to cure at room temperature for about 16 hours. The rubber mold 11 was then carefully removed from around the male plaster lens tool model 6 and cleaned with hot water and liquid soap.

Figure 8B:
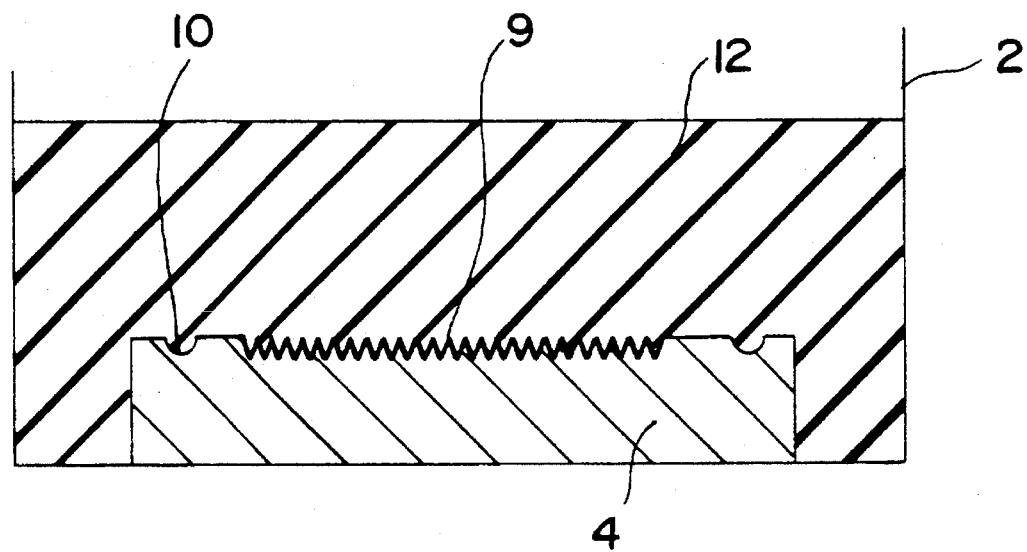

As shown in FIG. 8B, the female plaster lens tool model 4, having a serrated cross-section 9 and alignment holes 10, was placed within a container 2 with the flat side of the plaster lens tool model 4 contacting the bottom surface of the container 2 and the serrated cross-section 9 and alignment holes 10 facing up. A rubber molding compound 12, having a composition as described above, was poured into the container 2 and onto the female plaster lens tool model 4. The rubber mold 12 was allowed to cure at room temperature for about 16 hours. The rubber mold 12 was then carefully removed from around the female plaster lens tool model 4 and cleaned with hot water and liquid soap.

An aqueous solution of BLUONIC® A colloidal alumina (West Bond Corporation, Wilmington, Del.) weighing about 238 grams was diluted with about 462 grams of deionized water and placed into a plastic jar (VWR Scientific, Bridgeport, N.J). About 2000 grams of 500 grit 39 CRYSTOLON® green silicon carbide particulate (Norton Company, Worcester, Mass.) and about 2 milliliters of COLLOID 581-B defoamer (Colloids, Inc., Newark, N.J.) were added to the jar to prepare a slurry for sediment casting. The slurry was then roll mixed for about 20 hours on a jar mill. The rubber mold 11, having an internal cavity measuring about 9 inches (23 cm) by about 7 inches (18 cm) and about 1¼ inch (3.2 cm) deep, was placed onto a flat rigid aluminum plate. The mold/plate assembly was then placed onto a level vibrating table. The vibrating table was turned on, the slurry was removed from the jar mill and about 97% of the slurry was poured into the mold in a smooth and continuous manner. The mold and its contents were then subjected to vibration for about 1 hour to condense the slurry into a preform, with excess surface liquid being removed with a sponge. The vibrating table was turned off and the mold/plate/preform assembly was placed into a freezer. After residual water in the preform was substantially completely frozen, then the mold/plate/preform assembly was removed from the freezer and the frozen sediment cast preform 16, having dimensions of about 9 inches (23 cm) by about 7 inches (18 cm) and about ¾ inch (1.9 cm) thick, was removed from the mold.

An about 1 inch layer of 500 grit 38 ALUNDUM® alumina (Norton Company) was poured into a graphite boat. The preform 16 was then placed onto the 1 inch (2.5 cm) thick layer of 500 grit 38 ALUNDUM® alumina with the serrated cross-section 8 and alignment pins 7 contacting the 500 grit 38 ALUNDUM® alumina. Additional support for the preform was supplied by surrounding it with 24 grit 38 ALUNDUM® alumina (Norton Company), with care being taken not to allow the 24 grit 38 ALUNDUM® alumina to touch the serrated cross-section 8 and alignment pins 7. The graphite boat and its contents were placed into a controlled atmosphere furnace at about room temperature. A nitrogen gas flow rate of about 15 liters per minute was established within the furnace. The temperature in the furnace was then increased to about 85° C. in about ½ hour. After maintaining a temperature of about 85° C. for about 12 hours, the temperature in the furnace was increased to about 1050° C. at a rate of 100° C. per hour. After maintaining a temperature of about 1050° C. for about 2 hours, the temperature in the furnace was decreased to about room temperature at a rate of about 200° C. per hour. The graphite boat and its contents were then removed from the furnace. The preform 16 was removed from the graphite boat, and loose 38 ALUNDUM® alumina was removed from the preform 16.

A preform barrier coating was prepared by mixing about 60% by volume of DAG® 154 colloidal graphite (Acheson Colloids Co., Port Huron, Mich.) with about 40% by volume denatured ethanol. The barrier coating was then sprayed onto five sides of the preform using a touch-up gun. The bottom flat surface of the preform 19 was not coated. The barrier was allowed to air dry at room temperature prior to again spray coating. This procedure was repeated 11 times, so that the preform had 12 coats of barrier. The now coated preform 16 was placed into a controlled atmosphere furnace and a nitrogen gas flow rate of about 15 liters per minute was established. The temperature in the furnace was raised from about room temperature to about 800° C. at a rate of about 200° C. per hour. After maintaining a temperature of about 800° C. for about 1 hour, the temperature in the furnace was decreased to about room temperature at a rate of about 200° C. per hour. The preform 16 was removed from the furnace and it was noted that the graphite coating 17 had set on the preform 16.

Figure 9:
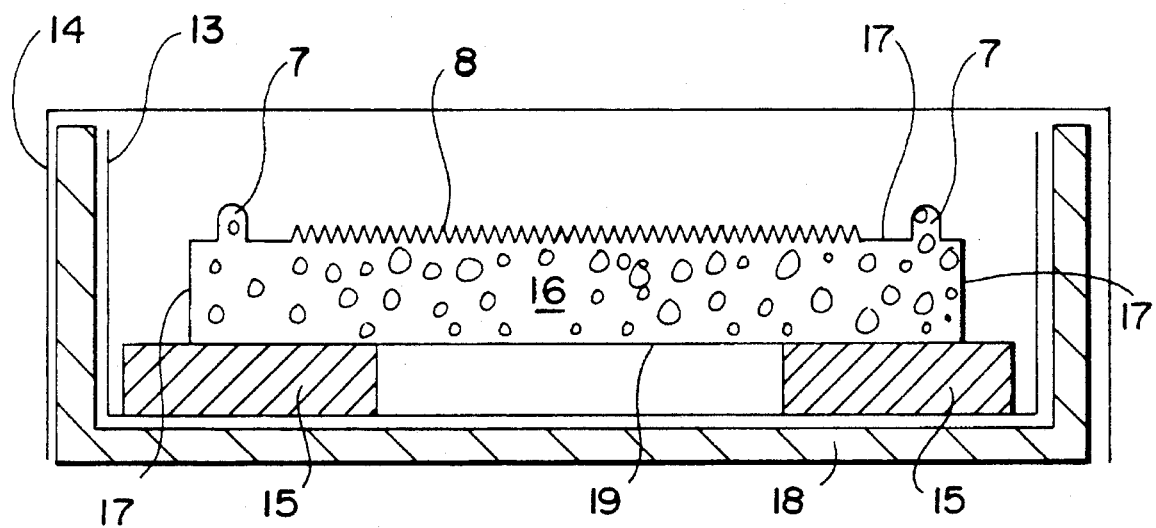
FIG. 9 is schematic cross-sectional views of rubber mold utilized to make preforms corresponding the metal matrix composite tool which is to be formed in accordance with Example 1.

As shown in FIG. 9, a graphite foil box 13, having dimensions of about 10½ inches (27 cm) by about 9½ inches (24 cm) and about 1½ inch (3.8 cm) high, was constructed from a single sheet of GRAFOIL® graphite foil (Union Carbide Co., Danbury, Conn.) measuring about 0.015 inch (0.04 cm) thick. Strategically placed staples helped to reinforce the folds in the graphite foil box 13. The graphite foil box 13 was placed within a graphite boat 18 having inside dimensions substantially the same as the outside dimensions of the graphite foil box 13. A matrix metal ingot weighing about 2915 grams and comprised by weight of about 15% silicon, about 5% magnesium and the balance aluminum, was cut into two strips. The matrix metal ingot strips 15 were then placed in the bottom and opposite end of the graphite foil box 13. The preform 16 was then placed on top of the matrix metal ingot strips 15 in a manner such that the strips were on an outer edge of the preform 16 and the serrated cross-section 8 and alignment pins 7 were on the top side of the lay-up. A graphite foil box cover 14 having inner dimensions substantially the same as the outer dimensions of the graphite boat 18 was prepared in a manner substantially the same as described above. The graphite foil box cover 14 was inverted and placed over the graphite boat 18, covering the boat/lay-up assembly.

A temperature of 125° C. was established within a resistance heated controlled atmosphere furnace, then the graphite boat 18 and its contents were placed in the furnace. The furnace was sealed, evacuated to about 30 inches of mercury vacuum, and backfilled with nitrogen gas to about atmospheric pressure. A nitrogen gas flow rate of about 15 liters per minute was established within the furnace. The temperature in the furnace was increased to about 785° C. at a rate of about 200° C. per hour. After maintaining a temperature of about 785° C. for about 20 hours, the furnace was opened and the graphite boat 18 and its contents were removed and placed on a ceramic plate. The graphite foil box cover 14 was removed and the pool of molten matrix metal surrounding the metal matrix composite body 16 was covered with an about 2 inch thick layer of FIBERFRAX® ceramic insulation material (Carborundum Company, Niagara Falls, N.Y.). The sides of the graphite boat 18 were also wrapped with FIBERFRAX® ceramic insulation material; however, the metal matrix composite body comprising the infiltrated preform comprising the infiltrated preform was not covered. When the assembly reached room temperature, the metal matrix composite body 16 comprising the infiltrated preform was removed from the graphite boat 18, placed in a vice, and residual matrix metal was removed from the metal matrix composite body male tool with light hammer blows. Thus forming the male portion of a metal matrix composite lens tool.

The female portion of the lens tool was produced in substantially the same manner as described above, except that the rubber mold 12 shown in FIG. 8B was used. Moreover, the preform barrier coating was prepared by mixing 50% by volume of DAG® 154 colloidal graphite (Acheson Colloids, Port Huron, Mich.) with about 50% by volume denatured ethanol. The barrier coating was then applied to five sides of the preform using an air brush. As with the male portion of the lens tool, the bottom flat surface of the preform for the female portion of the lens tool was not coated. The barrier was allowed to air dry and the procedure was repeated about 20 times. Finally, a single preform barrier coating was applied to the five sides of the female preform with a foam brush.

The lay-up and method for forming the female portion of the lens tools were substantially the same as the lay-up and method for forming the male portion of the lens tool.

Example 2

The following Example demonstrates a method for manufacturing an injection molding tool insert for plastics from a metal matrix composite. Specifically, the following Example demonstrates the formation of an injection molding tool insert for plastics from a metal matrix composite and a substantially identical tool insert from P-20 tool steel. A direct comparison was made between certain operational characteristics of the injection molding tool inserts made from the two materials as well as differences between the plastic bodies made therefrom.

Figure 10:
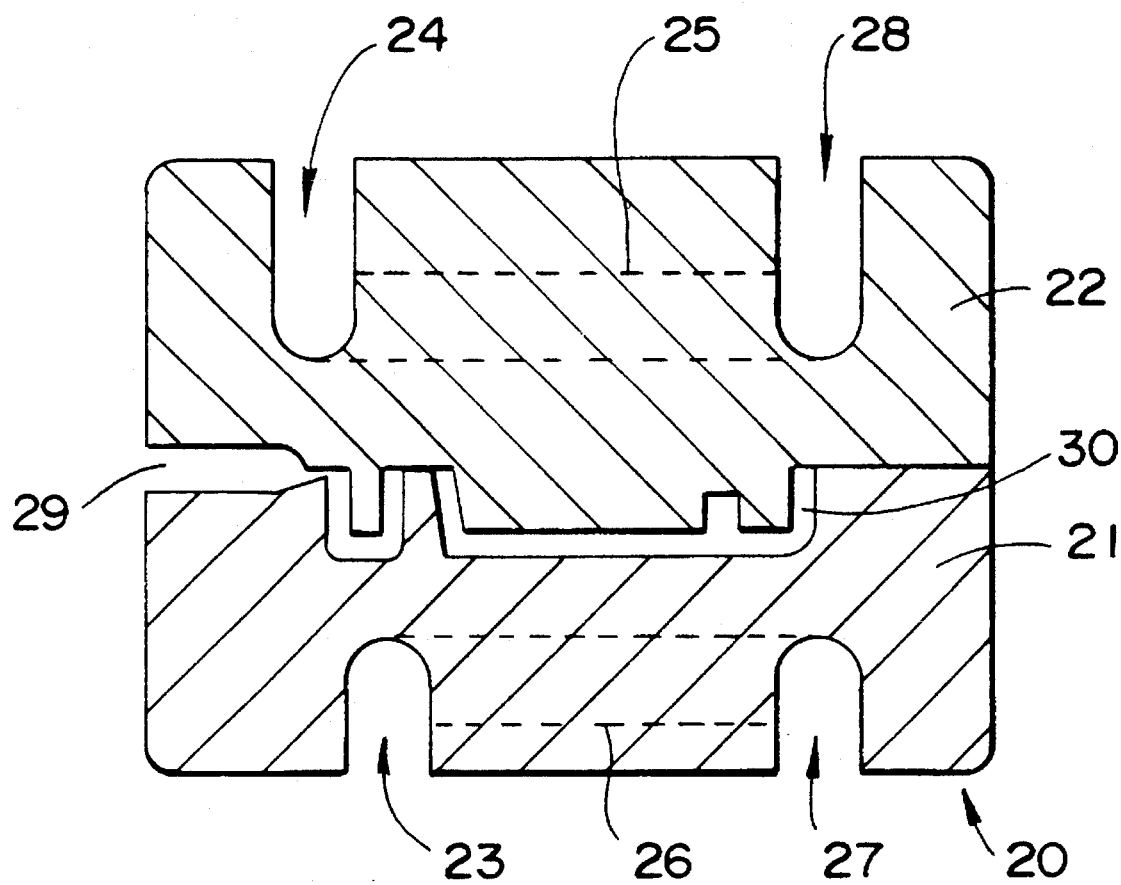
FIG. 10 is a schematic cross-sectional view of an injection molding tool insert made in accordance with Example 2.

FIG. 10 is a cross-sectional view of an injection molding tool insert 20 comprised of a cavity section 21 and a core section 22. The cavity section 21 included an injection gate 29, a coolant channel 26 connecting a coolant inlet 23 to a coolant outlet 27. Core section 22 further comprised a coolant channel 25 connecting a coolant inlet 24 to a coolant outlet 28. During the operation of the injection molding tool, core section 22 and cavity section 21 of the injection molding tool insert 20 were contacted as depicted in FIG. 10 to form a plastic part cavity 30 into which molten plastic was injected. Simultaneously, a coolant was passed through cooling channels 25 and 26.

Injection molding tool insert 20 comprised of a metal matrix composite was formed by first forming core section blanks and cavity section blanks by a method similar to that described in Example 1, with the coolout channel 25 and coolout channel 26 of the respective core section and cavity section being formed in situ. Specifically, a sediment casting mixture was made substantially according to the methods of Example 1, except that the 500 grit (average particle diameter of about 17 microns) 39 CRYSTOLON® green silicon carbide particulate (Norton Co., Worcester, Mass.) was substituted with a silicon carbide mixture comprised by weight of about 70 percent 220 grit (average particle diameter of about 66 microns) 39 CRYSTOLON® green silicon carbide particulate and 30 percent 500 grit (average particle diameter of about 17 microns) 39 CRYSTOLON® green silicon carbide particulate (both from Norton Co., Worcester, Mass.). Furthermore, the sediment casting of the silicon carbide preform was done in a polymethyl methacrylate mold, commonly known as Plexiglass®, measuring about 3.5 inches (88.9 mm) square by about 4 inches (102 mm) deep and around a wax mandrel to form the coolant channels. After the sediment cast preforms containing the embedded wax mandrel comprised of 0.375 inch (9.5 mm) diameter Red-C wax (Yate Wax) were removed from the freezer, the frozen sediment cast preforms having dimensions of about 3 inches (76 mm) square by about 3 inches (76 mm) thick were removed from the polymethyl methacrylate molds. The preforms were then processed substantially according to the method of Example 1 to remove the wax mandrel defining the internal channel, except that the furnace and its contents were heated from about room temperature to about 85° C. in about an hour, maintained at 85° C. for about 12 hours, heated from about 85° C. to about 500° C. at about 100° C. per hour, maintained at about 500° C. for about 4 hours, heated from about 500° C. to about 1200° C. at about 150° C. per hour. After about 2 hours at about 1200° C., the energy to the furnace was interrupted and the furnace and its contents were allowed to cool naturally to about room temperature. At about room temperature, the preform was removed from the furnace and it was noted that the wax mandrel embedded within the preforms had melted to form channels in the preform.

The channels within the preform were then filled with a mixture comprised of DYLON® Grade CW colloidal graphite (Dylon Industries Inc., Berea, Ohio) and KS 44 graphite (Lonza, Fairlawn, N.J.). The preform was then placed in the bottom of a graphite boat made from Grade ATJ graphite (Union Carbide Corporation, Carbon Products Division, Cleveland, Ohio). The graphite boat had inner dimensions measuring about 7 inches (178 mm) square and a depth of about 5 inches (127 mm). After the preform had been centered within the graphite boat, NYAD® FP coarse grade wollastonite (NYCO Minerals, Inc., Willsboro, N.J.) was poured into the space between the inner walls of the graphite boat and the outer perimeter of the preform to a depth of about 2.5 inches (64 mm). A mixture comprised by weight of about 2 percent F-69 glass frit (Fusion Ceramics Inc., Carrollton, Ohio) and about 98 percent 90 grit (average particle diameter of about 216 microns) electronic grade 38

ALUNDUM® alumina (Norton Co., Worcester, Mass.) was then poured to the height of the preform and leveled with the surface of the preform. A piece of graphite foil having slits corresponding in shape to an "X" and to the size of the surface of the preform was then placed in the graphite boat to cover the preform and materials surrounding the preform. A sufficient amount of about −50 mesh (particle diameter less than about 300 microns) magnesium powder was then placed along the slits forming the "X" within the graphite foil. A matrix metal ingot weighing about 1598 grams and having a composition comprised by weight of about 12.5 percent silicon, 3 percent magnesium and the balance aluminum was then placed on the graphite foil and on top of the −50 mesh magnesium powder. Additional material comprised of F-69 grit and 90 grit (average particle diameter of about 216 microns) electronic grade 30 ALUNDUM® alumina was then placed in the space between the matrix metal ingot and the graphite boat walls, so as to completely cover the matrix metal ingot, thereby forming a lay-up.

The lay-up was then placed into a controlled atmosphere furnace and the furnace door was closed. The furnace and its contents were then evacuated to about 30 inches (762 mm) of mercury vacuum, backfilled with nitrogen to about atmospheric pressure, again evacuated to about 30 inches (762 mm) of mercury vacuum and finally backfilled with nitrogen gas to a flow rate of about 4 liters per minute at atmospheric pressure. The furnace and its contents were then heated from about room temperature to about 225° C. at about 100° C. per hour, held at about 225° C. for about 2 hours, heated from about 225° C. to about 525° C. at about 90° C. per hour, held at about 525° C. for about 4 hours, then heated from about 525° C. to about 825° C. at about 150° C. per hour. After about 20 hours at about 825° C., the furnace and its contents were allowed to cool to about room temperature. At about room temperature, the lay-up was disassembled and it was noted that the preform had been infiltrated by the matrix metal to form a metal matrix composite core or cavity blank. The above procedure was repeated to form additional core blanks and cavity blanks.

The core and cavity blanks were then machined using conventional diamond machining in combination with RAM EDM machining to form a core section and a cavity section as depicted in FIG. 10. Specifically, the core section 22 measured about 3.5 inches (81 mm) square, about 1.25 inches (32 mm) thick and had a section that extended about 0.27 inch (6.9 mm) beyond the center line of the injection molding tool insert 20. Furthermore, the coolant channels 25 and 26 had a diameter about 0.375 inch (9.5 mm). The cavity section 21 measured substantially the same as that of the core section 22, except that instead of having a portion extending beyond the surface, it had a recess cavity measuring about 0.377 inch (9.6 mm) deep.

Injection Molding Comparison

Once the core and cavity sections comprising the metal matrix composite injection molding tool insert were prepared as discussed above, similar core and cavity sections made from P-20 tool steel were also made. Specifically, core and cavity portions were machined in a standard manner from P-20 tool steel to form core and cavity sections which substantially exactly replicated the size and shape of the metal matrix composite injection molding tool insert.

Each of the core and cavity sections manufactured from the metal matrix composite material and the P-20 tool steel were placed in a standard tooling mold base and functioned as part-forming inserts therein. Specifically, when plastic was injected into the gates 29 from a molding machine (not shown in drawings), the plastic simultaneously filled each of the cavities 30 contained in each of the metal matrix composite tool insert and the P-20 tool steel insert. The molding machine which communicated with the tool inserts was a Toshiba 250 ton molding machine. Four different plastics were injection molded into each of the tool inserts under different sets of processing parameters. The tool inserts were arranged in the mold base so that plastic could be simultaneously injected into each tool insert so that each tool insert was exposed to substantially identical processing conditions. Different coolant temperatures were utilized along with different cycle times. Temperature measurements on the formed pieces and on the surface of each of the mold inserts were made when the plastic pieces were removed from the mold inserts. Specifically, Tables I–IV set forth the material which was injection molded ("Material"), the temperature of the material when it was injection molded ("Melt temp."), the pressure exerted upon the material to cause it to be injected into the mold ("Screw inj. press."), and the amount of time required to fill the cavities in each of the tool inserts ("Fill time"). In addition, the Tables show in vertical columns the temperature of the coolant injected into the cooling channels in each of the molds ("Coolant Temp"), the amount of time between injecting material into the mold and opening the mold to eject the formed part ("Cycle Time"), the temperature of the formed part when it was removed from the mold ("Part Temp.") and the temperature of the surface of the mold when the part was removed from the mold ("Mold Surface Temp").

The columns entitled "Part Temp" and "Mold Surface Temp"set forth in each of Tables I–IV show that the metal matrix composite tool insert was superior to the P-20 tool steel insert in thermal properties. Particularly, both the temperature of the formed part and the surface temperature of the tool insert were consistently lower in the metal matrix composite tool insert in comparison to the P-20 tool steel insert. The temperature differential is significant because the faster a mold and injected part can cool, the shorter the cycle time between forming parts. Accordingly, mold inserts comprising a metal matrix composite can decrease the cycle time, thus increasing production efficiency.

Figure 11A:
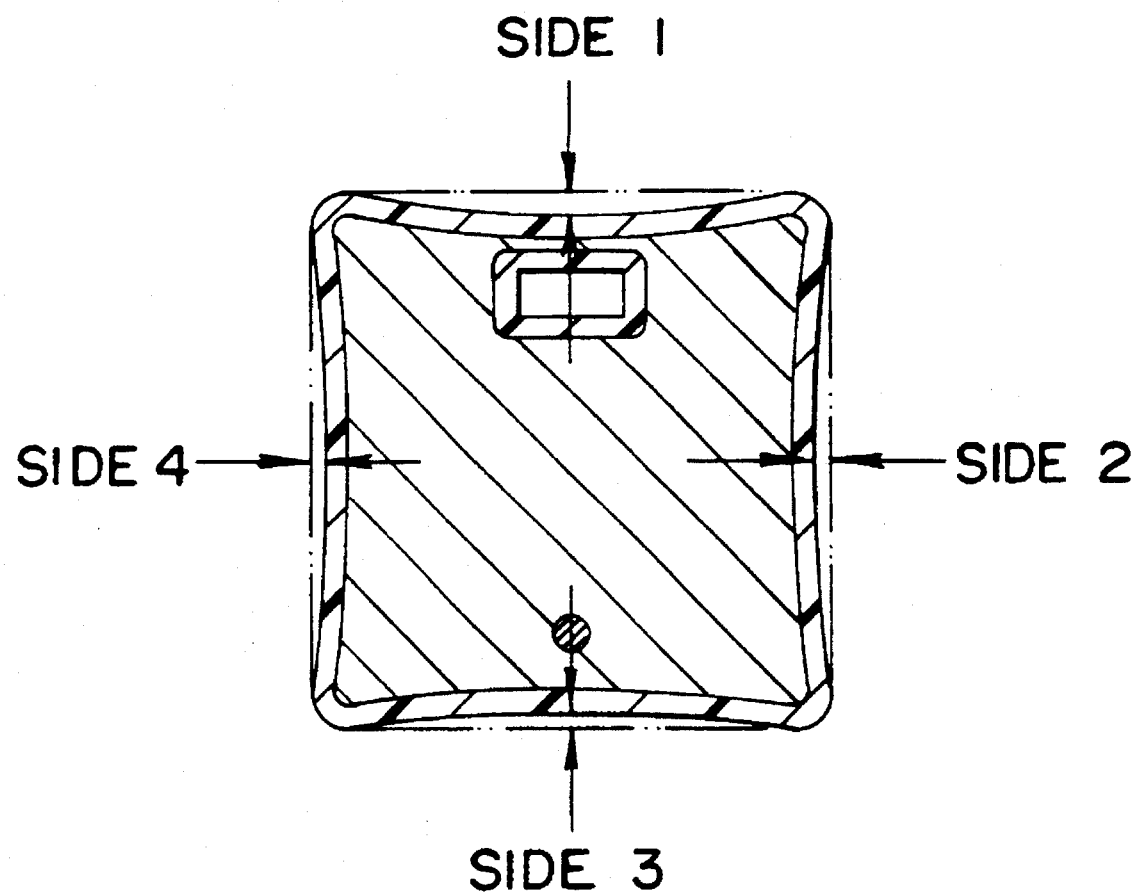
FIGS. 11A and 11B show how axial deviation is measured on a part made from the injection molding tool insert of Example 2, said part being shown in cross-section in both top view and side view, respectively.
Figure 11B:
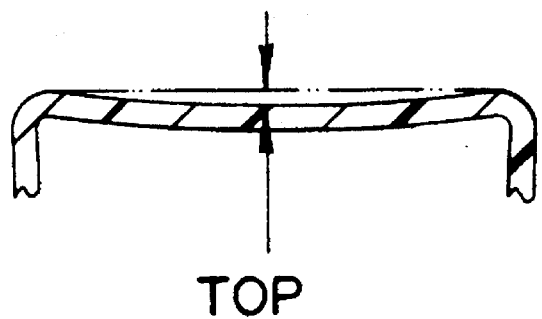

FIGS. 11A and 11B between the dotted lines and the solid lines). It is evident from Tables I–IV that warpage in the parts formed from the metal matrix composite tool inserts was less than warpage in the parts formed from the P-20 tool steel inserts.

In addition, after numerous cycles, no wear of the surfaces of the MMC tool insert material was evident. This was true even though injection pressures ranged between about 4000–8000 psi (28 MPa–55 MPa).

TABLE I

| Material: | | | | BASF 30% talc filled polyacetal | | | | |
|---|---|---|---|---|---|---|---|---|
| Melt temp.: | | | | 199° C. | | | | |
| Screw inj. press.: | | | | 407 kg | | | | |
| Fill time.: | | | | 0.7 seconds | | | | |

| | Coolant | Cycle | Part | Mold Surface | Axial Deviation | | | | |
|---|---|---|---|---|---|---|---|---|---|
| | Temp. (°C.) | Time (sec.) | Temp. (°C.) | Temp. (°C.) | Side 1 (in/mm) | Side 2 (in/mm) | Side 3 (in/mm) | Side 4 (in/mm) | Top (in/mm) |
| P-20 Steel | 32 | 12 | 91 | 77 | 0.018/0.457 | 0.010/0.254 | 0.011/0.279 | 0.011/0.279 | 0.006/0.152 |
| MMC | 32 | 12 | 76 | 38 | 0.010/0.254 | 0.007/0.178 | 0.007/0.178 | 0.007/0.178 | 0.007/0.178 |
| P-20 Steel | 32 | 17 | 69 | 56 | 0.015/0.381 | 0.008/0.203 | 0.007/0.178 | 0.008/0.203 | 0.006/0.152 |
| MMC | 32 | 17 | 55 | 37 | 0.008/0.203 | 0.005/0.127 | 0.005/0.127 | 0.005/0.127 | 0.006/0.152 |
| P-20 Steel | 60 | 12 | 102 | 79 | 0.018/0.457 | 0.013/0.330 | 0.010/0.254 | 0.010/0.254 | 0.010/0.254 |
| MMC | 60 | 12 | 91 | 54 | 0.010/0.254 | 0.006/0.152 | 0.007/0.178 | 0.006/0.152 | 0.008/0.457 |
| P-20 Steel | 60 | 17 | 86 | 82 | 0.015/0.381 | 0.008/0.203 | 0.010/0.254 | 0.009/0.229 | 0.007/0.178 |
| MMC | 60 | 17 | 75 | 53 | 0.008/0.203 | 0.005/0.127 | 0.004/0.102 | 0.005/0.127 | 0.005/0.127 |

TABLE II

| Material: | | | | Himont SA747 clarified polypropylene | | | | |
|---|---|---|---|---|---|---|---|---|
| Melt temp.: | | | | 213° C. | | | | |
| Screw inj. press.: | | | | 407 kg | | | | |
| Fill time.: | | | | 0.37 seconds | | | | |

| | Coolant | Cycle | Part | Mold Surface | Axial Deviation | | | | |
|---|---|---|---|---|---|---|---|---|---|
| | Temp. (°C.) | Time (sec.) | Temp. (°C.) | Temp. (°C.) | Side 1 (in/mm) | Side 2 (in/mm) | Side 3 (in/mm) | Side 4 (in/mm) | Top (in/mm) |
| P-20 Steel | 32 | 12 | 100 | 41 | 0.010/0.254 | 0.008/0.203 | 0.010/0.254 | 0.009/0.229 | 0.014/0.356 |
| MMC | 32 | 12 | 91 | 34 | 0.006/0.152 | 0.005/0.127 | 0.003/0.076 | 0.004/0.102 | 0.006/0.152 |
| P-20 Steel | 32 | 17 | 71 | 39 | 0.007/0.178 | 0.007/0.178 | 0.009/0.229 | 0.010/0.254 | 0.011/0.279 |
| MMC | 32 | 17 | 63 | 32 | 0.005/0.127 | 0.003/0.076 | 0.005/0.127 | 0.007/0.178 | 0.007/0.178 |
| P-20 Steel | 60 | 17 | 93 | 79 | 0.005/0.127 | 0.007/0.178 | 0.008/0.203 | 0.008/0.203 | 0.003/0.076 |
| MMC | 60 | 17 | 86 | 51 | 0.003/0.076 | 0.003/0.076 | 0.004/0.102 | 0.004/0.102 | 0.005/0.127 |
| P-20 Steel | 60 | 22 | 80 | 77 | 0.007/0.178 | 0.009/0.229 | 0.007/0.178 | 0.009/0.229 | 0.005/0.127 |
| MMC | 60 | 22 | 74 | 51 | 0.005/0.127 | 0.005/0.127 | 0.005/0.127 | 0.005/0.127 | 0.008/0.203 |

TABLE III

| Material: | | | | Fina polystyrene | | | | |
|---|---|---|---|---|---|---|---|---|
| Melt temp.: | | | | 212° C. | | | | |
| Screw inj. press.: | | | | 407 kg | | | | |
| Fill time.: | | | | 0.5 seconds | | | | |

| | Coolant | Cycle | Part | Mold Surface | Axial Deviation | | | | |
|---|---|---|---|---|---|---|---|---|---|
| | Temp. (°C.) | Time (sec.) | Temp. (°C.) | Temp. (°C.) | Side 1 (in/mm) | Side 2 (in/mm) | Side 3 (in/mm) | Side 4 (in/mm) | Top (in/mm) |
| P-20 Steel | 32 | 12 | 74 | 39 | 0.004/0.102 | 0.003/0.076 | 0.004/0.102 | 0.003/0.076 | 0.002/0.051 |
| MMC | 32 | 12 | 64 | 33 | 0.002/0.051 | 0.001/0.025 | 0.001/0.025 | 0.001/0.025 | 0.000/0.000 |
| P-20 Steel | 32 | 17 | 55 | 46 | 0.002/0.051 | 0.002/0.051 | 0.002/0.051 | 0.002/0.051 | 0.002/0.051 |
| MMC | 32 | 17 | 46 | 33 | 0.001/0.025 | 0.001/0.025 | 0.001/0.025 | 0.001/0.025 | 0.000/0.000 |
| P-20 Steel | 60 | 17 | 72 | 71 | 0.003/0.076 | 0.003/0.076 | 0.003/0.076 | 0.003/0.076 | 0.001/0.025 |
| MMC | 60 | 17 | 67 | 50 | 0.002/0.051 | 0.001/0.025 | 0.001/0.025 | 0.001/0.025 | 0.001/0.025 |
| P-20 Steel | 60 | 22 | 66 | 66 | 0.002/0.051 | 0.002/0.051 | 0.002/0.051 | 0.002/0.051 | 0.002/0.051 |
| MMC | 60 | 22 | 60 | 50 | 0.000/0.000 | 0.001/0.025 | 0.000/0.000 | 0.001/0.025 | 0.002/0.051 |

TABLE IV

| | | | | Material:<br>Melt temp.:<br>Screw inj. press.:<br>Fill time.: | | Mobay FCR polycrabonate<br>274° C.<br>679 kg<br>0.65 seconds | | | |
|---|---|---|---|---|---|---|---|---|---|
| | Coolant | Cycle | Part | Mold Surface | Axial Deviation | | | | |
| | Temp. (°C.) | Time (sec.) | Temp. (°C.) | Temp. (°C.) | Side 1 (in/mm) | Side 2 (in/mm) | Side 3 (in/mm) | Side 4 (in/mm) | Top (in/mm) |
| P-20 Steel | 32 | 12 | 76 | 49 | 0.005/0.127 | 0.003/0.076 | 0.004/0,102 | 0.003/0.076 | 0.005/0.127 |
| MMC | 32 | 12 | 66 | 35 | 0.003/0.076 | 0.002/0.051 | 0.002/0.051 | 0.001/0.025 | 0.002/0.051 |
| P-20 Steel | 32 | 17 | 55 | 49 | 0.003/0.076 | 0.004/0.102 | 0.003/0.076 | 0.003/0.076 | 0.004/0.102 |
| MMC | 32 | 17 | 46 | 35 | 0.002/0.051 | 0.002/0.051 | 0.001/0.025 | 0.002/0.051 | 0.002/0.051 |
| P-20 Steel | 60 | 17 | 95 | 93 | 0.004/0.102 | 0.003/0.076 | 0.004/0.102 | 0.004/0.102 | 0.004/0.102 |
| MMC | 60 | 17 | 84 | 53 | 0.002/0.051 | 0.002/0.051 | 0.002/0.051 | 0.002/0.051 | 0.003/0.076 |
| P-20 Steel | 60 | 22 | 76 | 93 | 0.004/0.102 | 0.004/0.102 | 0.004/0.102 | 0.004/0.102 | 0.004/0.102 |
| MMC | 60 | 22 | 67 | 53 | 0.002/0.051 | 0.002/0.051 | 0.001/0.025 | 0.002/0.051 | 0.003/0.076 |

What is claimed is:

1. A metal matrix composite injection molding tool for plastic materials, said tool comprising:

a first metal matrix composite portion having therethrough at least one of a sprue or a gate providing a means for communication between a region external to said tool and at least one internal cavity for forming said plastic materials, wherein at least one surface defining said at least one of a gate or a sprue comprises protuberances, wherein said protuberances introduce turbulence into said plastic material during flow of said plastic material in or through said gate or sprue;

at least one additional metal matrix composite portion coupling in a complementary manner with said first portion to define further said at least one internal cavity.

2. The tool of claim 1, further comprising at least one heating or cooling channel located within at least one of said first metal matrix composite portion and said at least one additional portion, wherein said at least one heating or cooling channel maximizes at least one of the production of parts and the mechanical properties of the parts produced in said tool.

3. The metal matrix composite injection molding tool of claim 1, wherein at least one of said first metal matrix composite portion and said at least one additional metal matrix composite portion comprises an aluminum matrix metal and a silicon carbide filler material.

4. The metal matrix composite injection molding tool of claim 1, wherein at least one of said first metal matrix composite portion and said at least one additional metal matrix composite portion comprises at least one matrix selected from the group consisting of aluminum, bronze, and cast iron and at least one filler is selected from the group consisting of powders, flakes, platelets, microspheres, whiskers, bubbles, fiber mats and ceramic-coated fillers.

5. A metal matrix composite injection molding tool for plastic materials comprising:

a metal matrix composite material base portion;

at least one forming surface integral to said base portion, said at least one forming surface comprising a textured surface;

at least one heating or cooling channel within said base portion and communicating with an area external to said base portion; and at least one wall portion of at least one of a gate or a sprue extending through said base portion, said at least one wall portion comprising protrusions, wherein said protrusions introduce turbulence into a thermoplastically deformable material during flow of said thermoplastically deformable material in said at least one of a gate or a sprue.

6. The metal matrix composite injection molding tool of claim 5, wherein said metal matrix composite material base portion comprises an aluminum matrix metal and a silicon carbide filler material.

7. The metal matrix composite injection molding tool of claim 5, wherein said metal matrix composite material base portion comprises at least one matrix selected from the group consisting of aluminum, bronze, and cast iron and at least one filler is selected from the group consisting of powders, flakes, platelets, microspheres, whiskers, bubbles, fiber mats and ceramic-coated fillers.

8. An injection molding tool for plastic materials comprising:

a metal matrix composite core section;

a metal matrix composite cavity section having at least one surface defining at least one of a gate or sprue comprising protuberances, wherein said protuberances introduce turbulence into said plastic material during flow of said plastic material in or through said gate or sprue; and at least one cooling channel in at least one of said core section and said cavity section, wherein said at least one cooling channel is proximately located to the plastic material during injection of said plastic material.

9. The injection molding tool of claim 8, wherein at least one of said metal matrix composite core section and said metal matrix composite cavity section comprise an aluminum matrix metal and a silicon carbide filler material.

10. The injection molding tool of claim 8, wherein at least one of said metal matrix composite core section and said metal matrix composite cavity section comprise at least one matrix selected from the group consisting of aluminum, bronze, and cast iron and said at least one filler is selected from the group consisting of powders, flakes, platelets, microspheres, whiskers, bubbles, fiber mats and ceramic-coated fillers.

11. The injection molding tool of claim 8, wherein said at least one cooling channel is located in each of said core section and said cavity section.

12. The injection molding tool of claim 8, wherein said at least one surface defining at least one of a gate or sprue comprises protuberances which introduce turbulence into the plastic material during flow of said plastic material in said at least one of a gate or a sprue.

* * * * *